United States Patent
Bian et al.

(10) Patent No.: US 12,192,614 B2
(45) Date of Patent: Jan. 7, 2025

(54) PHOTOGRAPHING METHOD IN LONG-FOCUS SCENARIO AND TERMINAL

(71) Applicant: HUAWEI TECHNOLOGIES CO., LTD., Guangdong (CN)

(72) Inventors: Chao Bian, Nanjing (CN); Jinghua Yuan, Shanghai (CN); Zhen Li, Shanghai (CN); Yang Liu, Shanghai (CN); Lu Ge, Shenzhen (CN); Fengxia Kang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 17/848,385

(22) Filed: Jun. 23, 2022

(65) Prior Publication Data
US 2022/0321797 A1 Oct. 6, 2022

Related U.S. Application Data

(63) Continuation of application No. PCT/CN2020/127598, filed on Nov. 9, 2020.

(30) Foreign Application Priority Data

Dec. 25, 2019 (CN) .......................... 201911352220.X
Mar. 13, 2020 (CN) .......................... 202010176192.7

(51) Int. Cl.
*H04N 23/63* (2023.01)
*H04N 23/667* (2023.01)
*H04N 23/69* (2023.01)

(52) U.S. Cl.
CPC ......... *H04N 23/632* (2023.01); *H04N 23/635* (2023.01); *H04N 23/667* (2023.01); *H04N 23/69* (2023.01)

(58) Field of Classification Search
CPC .. H04N 23/632; H04N 23/635; H04N 23/667; H04N 23/69; H04N 23/631; H04N 23/65; H04N 23/62; H04N 23/67
See application file for complete search history.

(56) References Cited

U.S. PATENT DOCUMENTS

| 2003/0160886 A1 | 8/2003 | Misawa et al. |
| 2008/0062250 A1 | 3/2008 | Rye et al. |
| (Continued) | | |

FOREIGN PATENT DOCUMENTS

| CN | 101459773 A | 6/2009 |
| CN | 101848338 A | 9/2010 |
| (Continued) | | |

OTHER PUBLICATIONS

ITU-T H.264(Jun. 2019), Series H: Audiovisual and Multimedia Systems, Infrastructure of audiovisual services—Coding of moving video, Advanced video coding for generic audiovisual services, total 836 pages.

*Primary Examiner* — Joseph W Becker

(57) ABSTRACT

A photographing method in a long-focus scenario and a terminal are provided. A moving direction and a moving distance of a framing range of the terminal can be controlled, so that a target photographing object accurately moves into the framing range, to improve efficiency of interaction between a user and the terminal. The method provides, when a zoom magnification used by a terminal is greater than or equal to a preset magnification, a photographing interface displayed by the terminal includes a first viewfinder frame and a second viewfinder frame. The first viewfinder frame is used to preview an image captured by a long-focus camera. A framing range of the second viewfinder frame is greater than a framing range of the first viewfinder frame, and a
(Continued)

framing range the same as that of the first viewfinder frame is marked in the second viewfinder frame.

19 Claims, 27 Drawing Sheets

(56) References Cited

U.S. PATENT DOCUMENTS

| | | | |
|---|---|---|---|
| 2010/0245630 A1 | 9/2010 | Kurokawa | |
| 2012/0268641 A1 | 10/2012 | Kazama | |
| 2014/0176777 A1 | 6/2014 | Lu | |
| 2018/0070018 A1* | 3/2018 | Bian | H04N 23/698 |

FOREIGN PATENT DOCUMENTS

| | | |
|---|---|---|
| CN | 101877764 A | 11/2010 |
| CN | 102348059 A | 2/2012 |
| CN | 102724398 A | 10/2012 |
| CN | 102761700 A | 10/2012 |
| CN | 102957870 A | 3/2013 |
| CN | 104052923 A | 9/2014 |
| CN | 104243832 A | 12/2014 |
| CN | 104580729 A | 4/2015 |
| CN | 104580897 A | 4/2015 |
| CN | 104980659 A | 10/2015 |
| CN | 105100605 A | 11/2015 |
| CN | 105635570 A | 6/2016 |
| CN | 105830012 A | 8/2016 |
| CN | 105959553 A | 9/2016 |
| CN | 106161941 A | 11/2016 |
| CN | 108200350 A | 6/2018 |
| CN | 110445978 A | 11/2019 |
| CN | 111010506 A | 4/2020 |
| EP | 3190496 A1 | 7/2017 |
| EP | 4044580 A1 | 8/2022 |
| JP | 2010232962 A | 10/2010 |
| JP | 2011044863 A | 3/2011 |
| JP | 2014179940 A | 9/2014 |
| JP | 2017175589 A | 9/2017 |
| WO | 2017200049 A1 | 11/2017 |
| WO | 2019087902 A1 | 5/2019 |

* cited by examiner

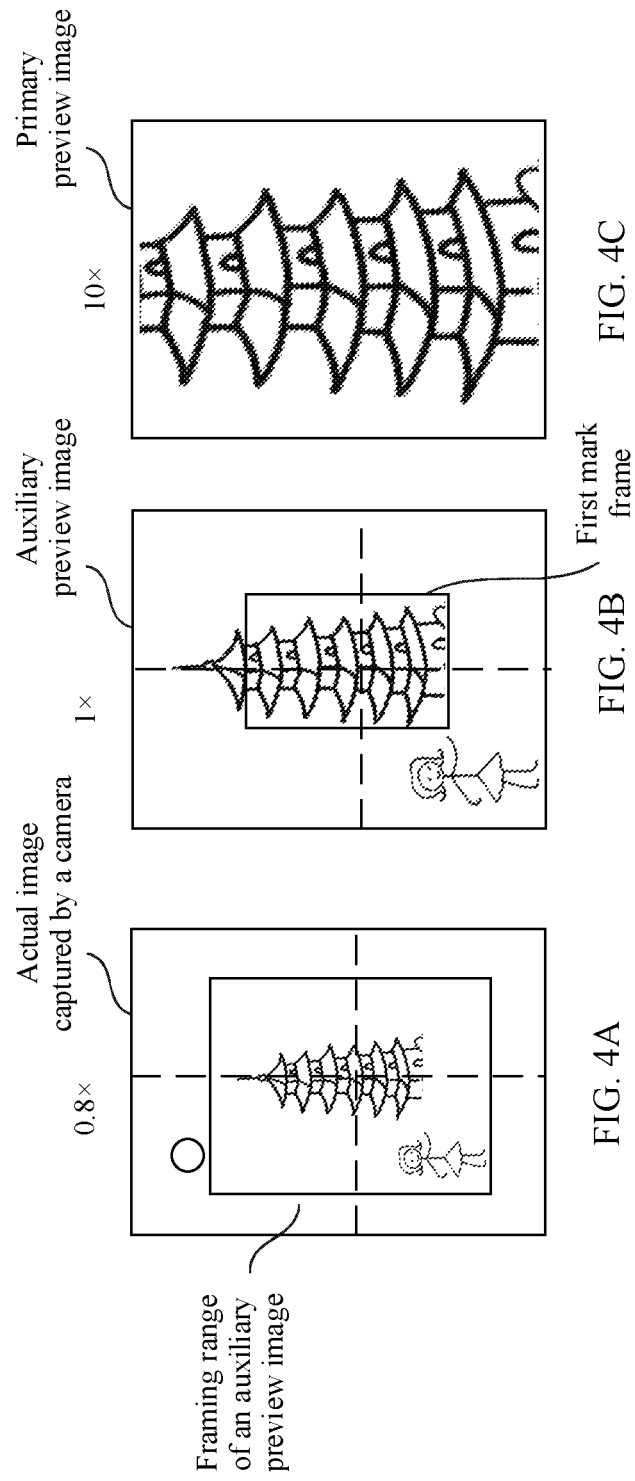

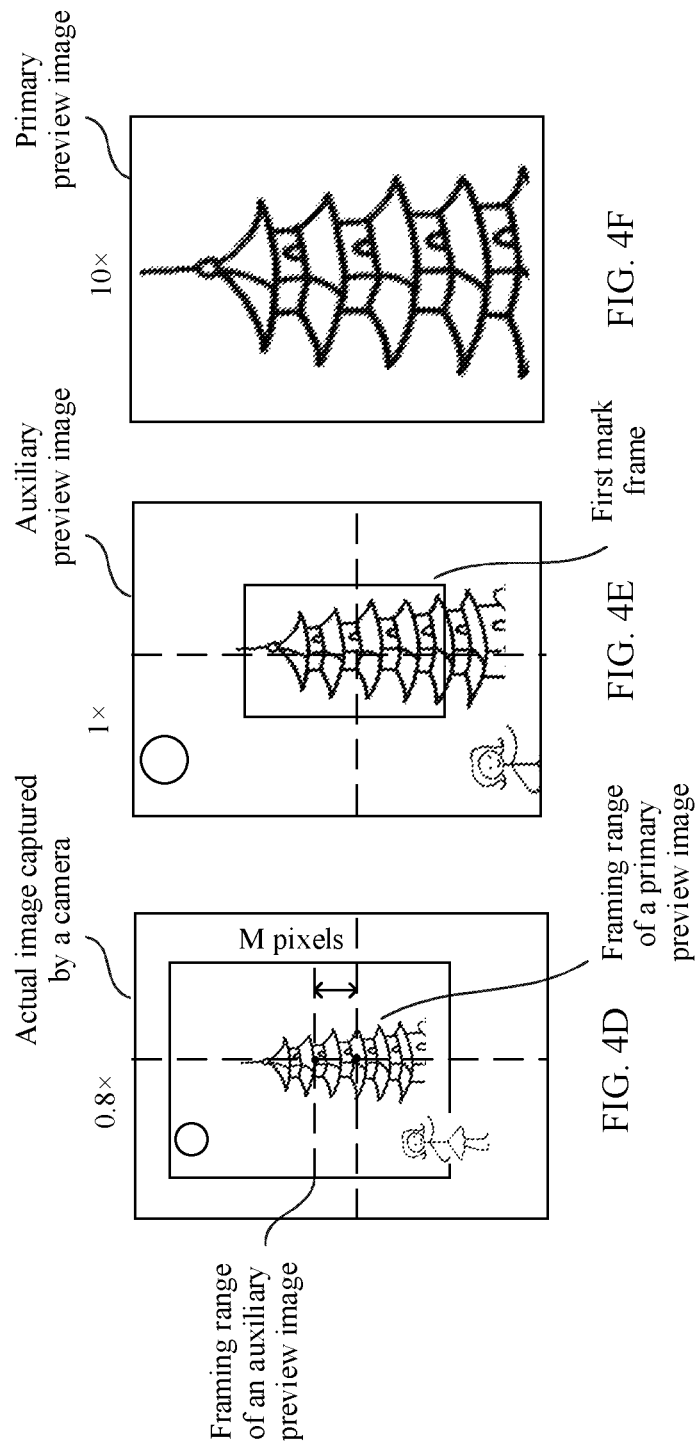

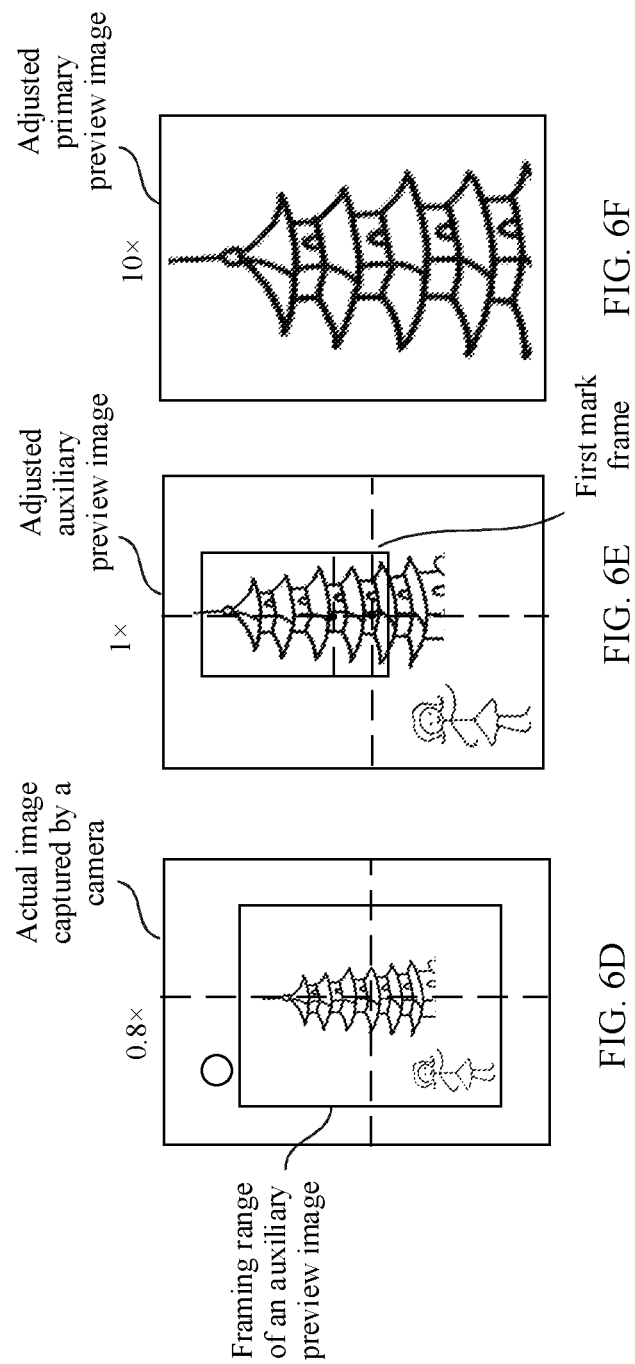

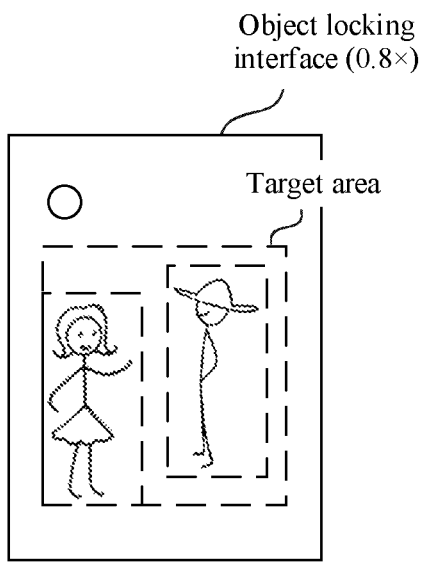
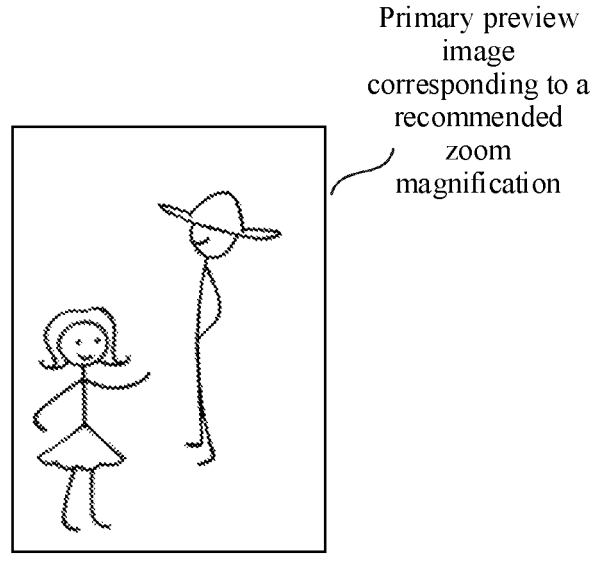
FIG. 10A
FIG. 10B
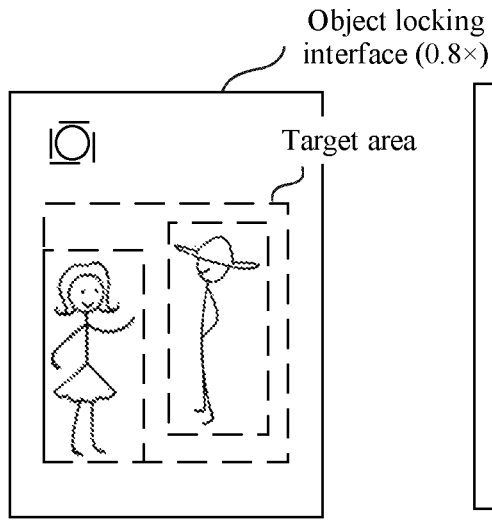
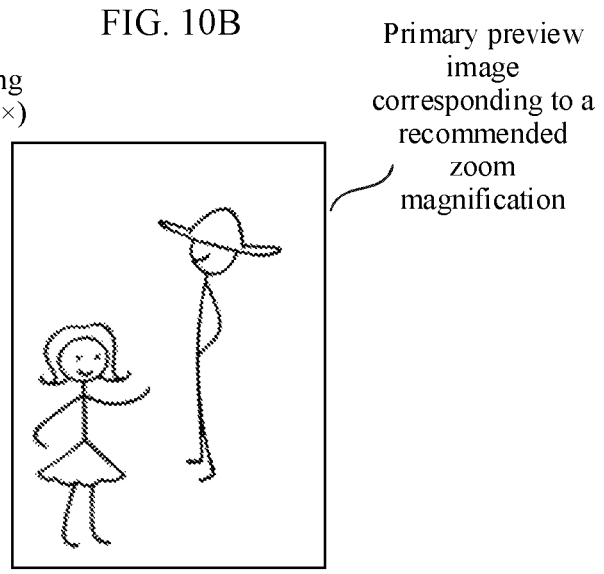
FIG. 10C
FIG. 10D

PHOTOGRAPHING METHOD IN LONG-FOCUS SCENARIO AND TERMINAL

CROSS-REFERENCE TO RELATED APPLICATIONS

This application is a continuation of International Patent Application No. PCT/CN2020/127598 filed on Nov. 9, 2020, which claims priority to Chinese Patent Application No. 202010176192.7 filed on Mar. 13, 2020 and Chinese Patent Application No. 201911352220.X filed on Dec. 25, 2019. All of the aforementioned patent applications are hereby incorporated by reference in their entireties.

TECHNICAL FIELD

This application relates to the field of terminal technologies, and in particular, to a photographing method in a long-focus scenario and a terminal.

BACKGROUND

Currently, a mobile phone is usually configured with a plurality of cameras to meet various photographing scenarios of a user. The plurality of cameras may include a short-focus (wide-angle) camera, a medium-focus camera, and a long-focus camera. When the user performs photographing, the mobile phone may switch between cameras with different focal lengths (that is, optical zoom) for photographing, and sometimes may process a captured picture in combination with a software processing manner of digital zoom, to meet various photographing scenarios with high zoom magnifications.

However, in a photographing scenario with a high zoom magnification, a framing range of the mobile phone is only a part of a to-be-photographed scene, and is usually relatively small. In addition, in actual photographing, most users hold the mobile phone to perform photographing. Therefore, a slight shake may cause a target photographing object to move out of the framing range of the mobile phone. Because the user does not know a direction and a distance of a current target photographing object relative to the framing range of the mobile phone, the user can only move the mobile phone to attempt to search for the target photographing object. An entire search process is usually time-consuming and labor-consuming, and user experience is very poor.

SUMMARY

According to a photographing method in a long-focus scenario and a terminal that are provided in embodiments of this application, a moving direction and a moving distance of a framing range of the terminal can be controlled, so that a target photographing object accurately moves into the framing range, to improve efficiency of interaction between a user and the terminal, and improve photographing experience.

To achieve the foregoing objective, embodiments of this application provide the following technical solutions:

According to a first aspect, a photographing method in a long-focus scenario is provided, including: A camera to display a first viewfinder frame. The first viewfinder frame displays a first preview image, and the first preview image corresponds to a first zoom magnification. In response to a detected operation of increasing a zoom magnification of the camera by a user, the first viewfinder frame displays a second preview image, the second preview image corresponds to a second zoom magnification, and the second zoom magnification is greater than the first zoom magnification. When the second zoom magnification is greater than or equal to a preset magnification, the terminal further displays a second viewfinder frame and a first mark frame. The second viewfinder frame is used to display a third preview image, a framing range of the third preview image is greater than a framing range of the second preview image, the first mark frame is used to identify a position, in the third preview image, of an image having the same framing range as the second preview image, and the framing range of the second preview image can be changed by using at least one adjustment control.

In the conventional technology, in a long-focus photographing mode, that is, when a zoom magnification used by a camera is greater than or equal to a preset magnification, a target photographing object may move out of a long-focus framing range (that is, a framing range of a second preview image) due to manual shaking of a user or movement of the target photographing object. The user needs to search for the target photographing object by moving a terminal. Because the user does not know a direction and a distance of a current target photographing object relative to the long-focus framing range, the user usually needs to repeatedly change a moving direction and a moving distance of the terminal. In addition, a relatively small moving distance of the terminal may cause a relatively large movement of the long-focus framing range, which increases difficulty and duration for the user to find the target photographing object. Therefore, embodiments of this application provide an auxiliary preview image (namely, the third preview image) whose framing range is greater than a long-focus auxiliary framing range, so that the user observes, from the auxiliary preview image, a direction and a distance of a target photographing object relative to a long-focus framing range of the terminal, to indicate the user to move the terminal. In addition, when the target photographing object is relatively close to the long-focus framing range, the user may further accurately control a moving direction and a moving distance of the long-focus framing range by using an adjustment control in the auxiliary framing preview image, so that the target photographing object accurately moves into the long-focus framing range. In addition, when the target photographing object is in the long-focus framing range, the user may also implement precise photographing composition by using the auxiliary preview image.

In a possible implementation, the at least one adjustment control includes a first control corresponding to a first direction, and the method further includes: When detecting an operation of the user on the first control corresponding to the first direction, the terminal moves the framing range of the second preview image towards the first direction by a first distance. The first distance is less than a preset threshold.

The first direction may be any direction parallel to a screen of the terminal, for example, upward (parallel to both sides of the terminal, and pointing to an upper edge of a mobile phone, where an earpiece is usually disposed at the upper edge of the mobile phone), downward (parallel to both sides of the terminal, and pointing to the upper edge of the mobile phone, where a microphone is usually disposed at the upper edge of the mobile phone), leftward (parallel to upper and lower edges of the mobile phone, and pointing to a left edge), rightward (parallel to upper and lower edges of the mobile phone, and pointing to a right edge), upper left, lower left, upper right, and lower right.

It can be learned that, each time the user operates the first control, the second preview image of the terminal moves towards a specific direction by the first distance. In other words, the user may control a quantity of operations on the first control, to control a distance by which the long-focus framing range moves towards the specific direction, so as to accurately control the moving direction and the moving distance of the long-focus framing range. This helps the target photographing object accurately move into the long-focus framing range.

In a possible implementation, the method further includes: When detecting the operation of the user on the first control corresponding to the first direction, the terminal moves the framing range of the third preview image towards the first direction by a second distance. A position of the first mark frame in the third preview image does not change. The second distance is related to a zoom magnification corresponding to the third preview image, the second zoom magnification, and the first distance.

In other words, when the long-focus framing range changes, a framing range of the auxiliary preview image also changes correspondingly. The position of the first mark frame in the auxiliary preview image is still located in a center position of the auxiliary preview image. In an example, a ratio of the zoom magnification corresponding to the third preview image to the second zoom magnification is equal to a ratio of the first distance to the second distance.

In a possible implementation, the method further includes: When detecting the operation of the user on the first control corresponding to the first direction, the terminal moves a position of the first mark frame in the third preview image towards the first direction by a second distance. The framing range of the third preview image does not change. The second distance is related to a zoom magnification corresponding to the third preview image, the second zoom magnification, and the first distance.

In other words, when the long-focus framing range changes, a framing range of the auxiliary preview image may not change, but the position of the first mark frame in the auxiliary preview image changes correspondingly.

In a possible implementation, the method further includes: When detecting a drag operation of the user on the first mark frame towards a first direction, the terminal moves the framing range of the second preview image towards the first direction by a first distance. The first distance is less than a preset threshold. This provides another operation method for adjusting the long-focus framing range.

In a possible implementation, the method further includes: When detecting the drag operation of the user on the first mark frame towards the first direction, the terminal moves the framing range of the third preview image towards the first direction by a second distance. A position of the first mark frame in the third preview image does not change. A ratio of a third zoom magnification corresponding to the third preview image to the second zoom magnification is equal to a ratio of the first distance to the second distance.

In a possible implementation, the method further includes: When detecting the drag operation of the user on the first mark frame towards the first direction, the terminal moves a position of the first mark frame in the third preview image towards the first direction by a second distance. The framing range of the third preview image does not change. A ratio of a third zoom magnification corresponding to the third preview image to the second zoom magnification is equal to a ratio of the first distance to the second distance.

In a possible implementation, the second preview image is obtained based on an image captured by a long-focus camera of the terminal, and the third preview image is obtained based on an image captured by a medium-focus camera or a wide-angle camera of the terminal.

In a possible implementation, the preset threshold is related to a size of the image captured by the long-focus camera and the second zoom magnification corresponding to the second preview image.

This is because a raw image captured by the camera of the terminal is a full-size image, and then the terminal crops the full-size image based on a resolution, a zoom magnification, and the like of the camera, and performs digital zoom to obtain a preview image displayed by the terminal. It should be noted that even if the preview image displayed by the terminal and the raw image captured by the camera of the terminal correspond to a same zoom magnification, in other words, zoom-in is not performed on the raw image, a size corresponding to the raw image is greater than a size corresponding to the preview image displayed by the terminal. Therefore, when the mobile phone and the camera are not moved, images in different areas in the raw image may be cropped, to achieve an effect of moving a framing range of a primary preview image. It can be learned that a moving distance of the primary preview image is also limited to a range of a full-size image that can be captured by the long-focus camera. A larger range of the full-size image that can be captured by the long-focus camera indicates a longer moving distance of the primary preview image. In addition, the moving distance of the primary preview image is also related to a zoom magnification of the primary preview image. When the range of the full-size image that can be captured by the long-focus camera is determined, a larger zoom magnification of the primary preview image indicates a larger moving distance of the primary preview image. In some other examples, when the primary preview image moves to a limit in a direction, the mobile phone may prompt the user that the primary preview image cannot move towards the direction anymore.

In a possible implementation, the method further includes: When detecting an operation of enabling a first mode by the user, the terminal displays a fourth preview image. A framing range of the fourth preview image is greater than or equal to the framing range of the third preview image. The terminal receives an operation of selecting one or more target photographing objects in the fourth preview image by the user. In response to the operation of selecting one or more target photographing objects, the terminal displays one or more second mark frames in the fourth preview image, and displays a recommended third zoom magnification. The one or more second mark frames are used to mark the one or more target photographing objects selected by the user.

In this way, the terminal quickly calculates an appropriate zoom magnification based on the one or more target photographing objects selected by the user, and recommends the appropriate zoom magnification to the user. This helps improve efficiency of interaction between the user and the terminal, and improve photographing experience of the user.

In a possible implementation, the third zoom magnification is obtained by the terminal through calculation based on positions and areas of the one or more target photographing objects in the fourth preview image and priorities of the one or more target photographing objects.

In a possible implementation, the method further includes: detecting an operation of selecting the third zoom magnification by the user. The first viewfinder frame of the terminal is used to display a fifth preview image, the fifth preview image corresponds to the third zoom magnification, the second viewfinder frame of the terminal is used to display a sixth preview image, and the sixth preview image includes the first mark frame and the one or more second mark frames.

According to a second aspect, a terminal is provided, including: a processor, a memory, and a touchscreen. The memory and the touchscreen are coupled to the processor, the memory is configured to store computer program code, the computer program code includes computer instructions, and when the processor reads the computer instructions from the memory, the terminal is enabled to perform the following operations: starting a camera to display a first viewfinder frame, where the first viewfinder frame is used to display a first preview image, and the first preview image corresponds to a first zoom magnification; displaying a second preview image in the first viewfinder frame in response to a detected operation of increasing a zoom magnification of the camera by a user, where the second preview image corresponds to a second zoom magnification, and the second zoom magnification is greater than the first zoom magnification; and when the second zoom magnification is greater than or equal to a preset magnification, further displaying a second viewfinder frame and a first mark frame, where the second viewfinder frame is used to display a third preview image, a framing range of the third preview image is greater than a framing range of the second preview image, the first mark frame is used to identify a position, in the third preview image, of an image having the same framing range as the second preview image, and the framing range of the second preview image can be changed by using at least one adjustment control.

In a possible implementation, the at least one adjustment control includes a first control corresponding to a first direction, and when the processor reads the computer instructions from the memory, the terminal is enabled to further perform the following operation: when detecting an operation of the user on the first control corresponding to the first direction, moving the framing range of the second preview image towards the first direction by a first distance, where the first distance is less than a preset threshold.

In a possible implementation, when the processor reads the computer instructions from the memory, the terminal is enabled to further perform the following operation: when detecting the operation of the user on the first control corresponding to the first direction, moving the framing range of the third preview image towards the first direction by a second distance, where a position of the first mark frame in the third preview image does not change, and the second distance is related to a zoom magnification corresponding to the third preview image, the second zoom magnification, and the first distance.

In a possible implementation, when the processor reads the computer instructions from the memory, the terminal is enabled to further perform the following operation: when detecting the operation of the user on the first control corresponding to the first direction, moving a position of the first mark frame in the third preview image towards the first direction by a second distance, where the framing range of the third preview image does not change, and the second distance is related to a zoom magnification corresponding to the third preview image, the second zoom magnification, and the first distance.

In a possible implementation, when the processor reads the computer instructions from the memory, the terminal is enabled to further perform the following operation: when detecting a drag operation of the user on the first mark frame towards a first direction, moving the framing range of the second preview image towards the first direction by a first distance, where the first distance is less than a preset threshold.

In a possible implementation, when the processor reads the computer instructions from the memory, the terminal is enabled to further perform the following operation: when detecting the drag operation of the user on the first mark frame towards the first direction, moving the framing range of the third preview image towards the first direction by a second distance, where a position of the first mark frame in the third preview image does not change, and the second distance is related to a zoom magnification corresponding to the third preview image, the second zoom magnification, and the first distance.

In a possible implementation, when the processor reads the computer instructions from the memory, the terminal is enabled to further perform the following operation: when detecting the drag operation of the user on the first mark frame towards the first direction, moving a position of the first mark frame in the third preview image towards the first direction by a second distance, where the framing range of the third preview image does not change, and the second distance is related to a zoom magnification corresponding to the third preview image, the second zoom magnification, and the first distance.

In a possible implementation, the second preview image is obtained based on an image captured by a long-focus camera of the terminal, and the third preview image is obtained based on an image captured by a medium-focus camera or a wide-angle camera of the terminal.

In a possible implementation, the preset threshold is related to a size of the image captured by the long-focus camera and the second zoom magnification corresponding to the second preview image.

In a possible implementation, when the processor reads the computer instructions from the memory, the terminal is enabled to further perform the following operations: when detecting an operation of enabling a first mode by the user, displaying a fourth preview image, where a framing range of the fourth preview image is greater than or equal to the framing range of the third preview image; receiving an operation of selecting one or more target photographing objects in the fourth preview image by the user; and in response to the operation of selecting one or more target photographing objects, displaying one or more second mark frames in the fourth preview image, and displaying a recommended third zoom magnification, where the one or more second mark frames are used to mark the one or more target photographing objects selected by the user.

In a possible implementation, the third zoom magnification is obtained by the terminal through calculation based on positions and areas of the one or more target photographing objects in the fourth preview image and priorities of the one or more target photographing objects.

In a possible implementation, when the processor reads the computer instructions from the memory, the terminal is enabled to further perform the following operation: detecting an operation of selecting the third zoom magnification by the user, where the first viewfinder frame of the terminal is used to display a fifth preview image, the fifth preview image corresponds to the third zoom magnification, the second viewfinder frame of the terminal is used to display a sixth preview image, and the sixth preview image includes the first mark frame and the one or more second mark frames.

According to a third aspect, a photographing apparatus is provided, including: a processing unit, a detection unit, and a display unit. The display unit is configured to display a first viewfinder frame after the processing unit starts a camera. The first viewfinder frame is used to display a first preview image, and the first preview image corresponds to a first zoom magnification. The display unit is further configured to display a second preview image in the first viewfinder frame in response to the detection unit detecting an operation of increasing a zoom magnification of the camera by a user. The second preview image corresponds to a second zoom magnification, and the second zoom magnification is greater than the first zoom magnification. The display unit is further configured to display a second viewfinder frame and a first mark frame when the processing unit determines that the second zoom magnification is greater than a preset magnification. The second viewfinder frame is used to display a third preview image, a framing range of the third preview image is greater than a framing range of the second preview image, the first mark frame is used to identify a position, in the third preview image, of an image having the same framing range as the second preview image, and the framing range of the second preview image can be changed by using at least one adjustment control.

In a possible implementation, the at least one adjustment control includes a first control corresponding to a first direction, and the processing unit is further configured to move the framing range of the second preview image towards the first direction by a first distance when the detection unit detects an operation of the user on the first control corresponding to the first direction. The first distance is less than a preset threshold.

In a possible implementation, the processing unit is further configured to move the framing range of the third preview image towards the first direction by a second distance when the detection unit detects the operation of the user on the first control corresponding to the first direction. A position of the first mark frame in the third preview image does not change, and the second distance is related to a zoom magnification corresponding to the third preview image, the second zoom magnification, and the first distance.

In a possible implementation, the processing unit is further configured to move a position of the first mark frame in the third preview image towards the first direction by a second distance when the detection unit detects the operation of the user on the first control corresponding to the first direction. The framing range of the third preview image does not change. The second distance is related to a zoom magnification corresponding to the third preview image, the second zoom magnification, and the first distance.

In a possible implementation, the processing unit is further configured to move the framing range of the second preview image towards the first direction by a first distance when the detection unit detects a drag operation of the user on the first mark frame towards the first direction. The first distance is less than a preset threshold.

In a possible implementation, the processing unit is further configured to move the framing range of the third preview image towards the first direction by a second distance when the detection unit detects the drag operation of the user on the first mark frame towards the first direction. A position of the first mark frame in the third preview image does not change, and the second distance is related to a zoom magnification corresponding to the third preview image, the second zoom magnification, and the first distance.

In a possible implementation, the processing unit is further configured to move a position of the first mark frame in the third preview image towards the first direction by a second distance when the detection unit detects the drag operation of the user on the first mark frame towards the first direction. The framing range of the third preview image does not change. The second distance is related to a zoom magnification corresponding to the third preview image, the second zoom magnification, and the first distance.

In a possible implementation, the second preview image is obtained based on an image captured by a long-focus camera of the terminal, and the third preview image is obtained based on an image captured by a medium-focus camera or a wide-angle camera of the terminal.

In a possible implementation, the preset threshold is related to a size of the image captured by the long-focus camera and the second zoom magnification corresponding to the second preview image.

In a possible implementation, the photographing apparatus further includes a communication unit. The display unit is further configured to display a fourth preview image when the detection unit detects an operation of enabling a first mode by the user. A framing range of the fourth preview image is greater than or equal to the framing range of the third preview image. The communication unit is configured to receive an operation of selecting one or more target photographing objects in the fourth preview image by the user. The display unit is configured to: in response to the operation of selecting one or more target photographing objects that is received by the communication unit, display one or more second mark frames in the fourth preview image, and display a recommended third zoom magnification. The one or more second mark frames are used to mark the one or more target photographing objects selected by the user.

In a possible implementation, the third zoom magnification is obtained by the terminal through calculation based on positions and areas of the one or more target photographing objects in the fourth preview image and priorities of the one or more target photographing objects.

In a possible implementation, the display unit is further configured to display a fifth preview image in the first viewfinder frame when the detection unit detects an operation of selecting the third zoom magnification by the user. The fifth preview image corresponds to the third zoom magnification, the second viewfinder frame of the terminal is used to display a sixth preview image, and the sixth preview image includes the first mark frame and the one or more second mark frames.

According to a fourth aspect, a chip system is provided, including a processor. When the processor executes instructions, the processor performs the method according to any one of the foregoing aspects and the possible implementations of the foregoing aspects.

According to a fifth aspect, a computer-readable storage medium is provided, including computer instructions. When the computer instructions are run on a terminal, the terminal is enabled to perform the method according to any one of the foregoing aspects and the possible implementations of the foregoing aspects.

According to a sixth aspect, a computer program product is provided. When the computer program product runs on a computer, the computer is enabled to perform the method according to any one of the foregoing aspects and the possible implementations of the foregoing aspects.

BRIEF DESCRIPTION OF DRAWINGS

FIG. 4A to FIG. 4F are schematic diagrams of an image processing method in a photographing method according to an embodiment of this disclosure;

FIG. 6A to FIG. 6F are schematic diagrams of an image processing method in another photographing method according to an embodiment of this disclosure;

FIG. 10A to FIG. 10F are schematic diagrams of an image processing method in yet another photographing method according to an embodiment of this disclosure.

DESCRIPTION OF EMBODIMENTS

In embodiments of this disclosure, the word "example", "for example", or the like is used to represent giving an example, an illustration, or a description. Any embodiment or design scheme described as an "example" or "for example" in embodiments of this application should not be interpreted as being more preferred or having more advantages than another embodiment or design scheme. Use of the word "example", "for example", or the like is intended to present a related concept in a specific manner.

The following terms "first" and "second" are merely intended for a purpose of description, and should not be interpreted as an indication or implication of relative importance or implicit indication of a quantity of indicated technical features. Therefore, a feature limited by "first" or "second" may explicitly or implicitly include one or more features. In the descriptions of embodiments of this application, "a plurality of" means two or more than two unless otherwise specified.

A method provided in embodiments of this application may be applied to a camera as well as to a terminal equipped with a camera. The terminal may be, for example, a mobile phone, a tablet computer, a personal computer (PC), a personal digital assistant (PDA), a smartwatch, a netbook, a wearable electronic device, an augmented reality (AR) device, a virtual reality (VR) device, a vehicle-mounted device, a smart car, a smart speaker, or a robot. A specific form of the terminal is not specifically limited in this application.

Figure 1:
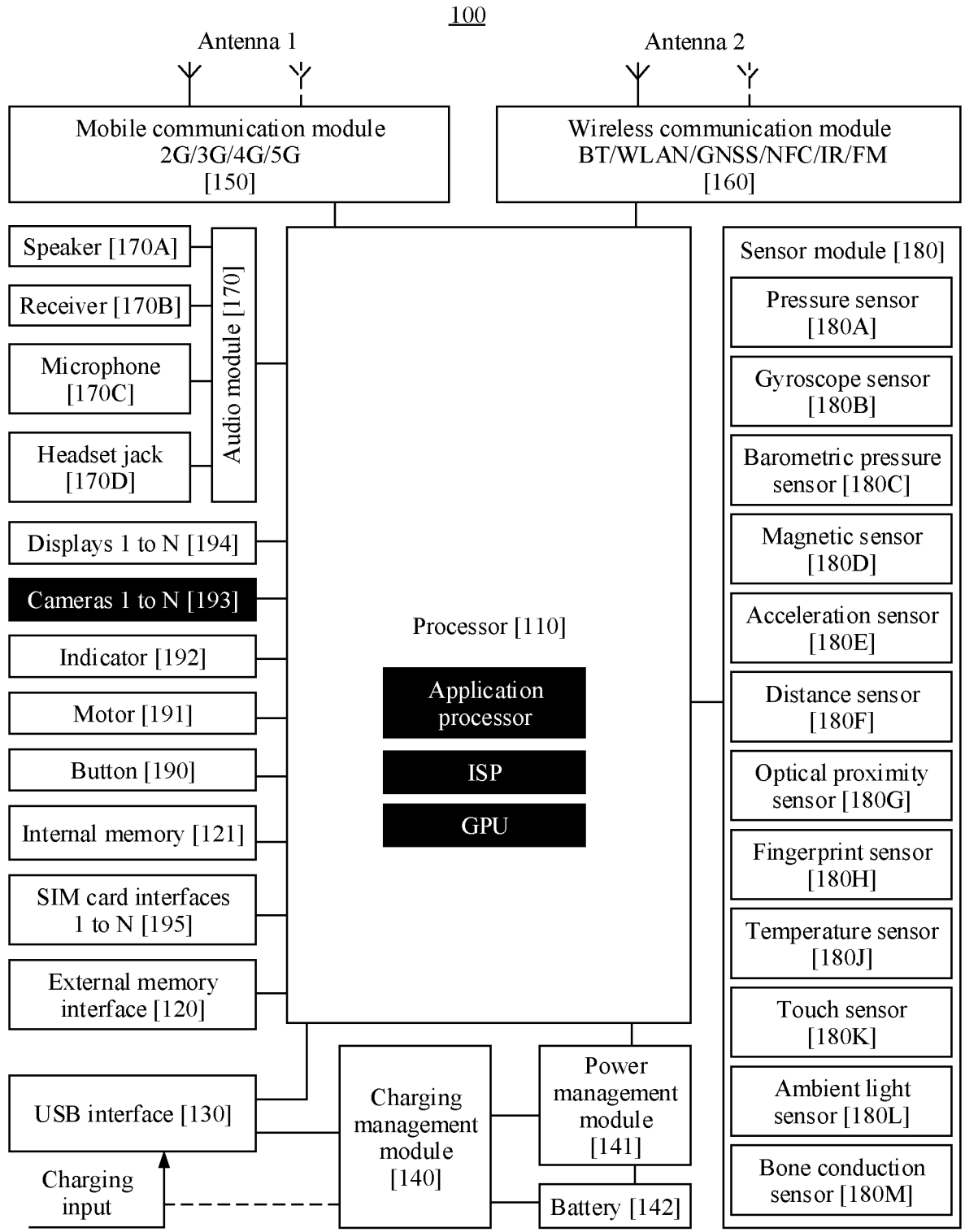
FIG. 1 is a schematic diagram of a structure of a terminal according to an embodiment of this disclosure.

FIG. 1 is a schematic diagram of a structure of a terminal 100. The terminal 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an illustrated structure in an embodiment does not constitute a specific limitation on the terminal 100. In some other embodiments of this application, the terminal 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

The controller may generate an operation control signal based on an instruction operation code and a time sequence signal to control instruction reading and instruction execution.

A memory may be integrated into the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may also be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the terminal 100, and may also be configured to transmit data between the terminal 100 and a peripheral device, or may be configured to connect to a headset, to play audio by using the headset. The interface may be further configured to connect to another terminal such as an AR device.

It may be understood that an interface connection relationship between the modules that is shown in this embodiment of the present invention is merely an example for description, and does not constitute a limitation on the structure of the terminal 100. In some other embodiments of this application, the terminal 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the terminal 100. When charging the battery 142, the charging management module 140 may further supply power to the terminal by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented by using the antenna 1, the antenna 2, the mobile communication module 150, the wireless communication module 160, the modem processor, the baseband processor, and the like.

The antenna 1 and the antenna 2 are configured to: transmit and receive electromagnetic wave signals. Each antenna in the terminal 100 may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The mobile communication module 150 can provide a solution, applied to the terminal 100, for wireless communication including 2G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in a same device as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in a same device as the mobile communication module 150 or another function module.

The wireless communication module 160 may provide a solution, applied to the terminal 100, for wireless communication including a wireless local area network (WLAN) (for example, a wireless fidelity (Wi-Fi) network), Bluetooth (Bluetooth, BT), a global navigation satellite system (GNSS), frequency modulation (FM), near field communication (nNFC), an infrared (IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the terminal 100, the antenna 1 is coupled to the mobile communication module 150, and the antenna 2 is coupled to the wireless communication module 160, so that the terminal 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system BDS), a quasi-zenith satellite system (QZSS), and/or a satellite based augmentation system (SBAS).

The terminal 100 implements the display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the terminal 100 may include one or N displays 194, where N is a positive integer greater than 1.

The terminal 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

In some embodiments of this application, the terminal 100 includes at least one medium-focus camera or wide-angle camera and at least one long-focus camera that are located on a same side of the mobile phone. The terminal 100 generates, based on an image captured by the long-focus camera, a primary preview image displayed in a first viewfinder frame. The terminal 100 generates, based on an image captured by the medium-focus camera or the wide-angle camera, an auxiliary preview image displayed in a second viewfinder frame. A framing range of the auxiliary preview image is greater than a framing range of the primary preview image. A framing range of a photo or a video finally generated by the terminal 100 is the same as that of the primary preview image. Further, the processor 110 (which may be specifically, for example, the application processor, the ISP, or the GPU) of the terminal 100 may further adjust the framing range of the primary preview image based on an adjustment operation of a user.

In some other embodiments, the terminal 100 may further obtain a related preview image on an object locking interface based on an image captured by the medium-focus camera or the wide-angle camera, so that the user locks one or more target photographing objects. Further, the processor 110 (which may be specifically, for example, the application processor, the ISP, or the GPU) of the terminal 100 may further calculate a recommended zoom magnification based on factors such as positions and areas of the one or more selected target photographing objects, a sequence of locking the target object, and a type of the locked target object, and recommend the recommended zoom magnification to the user.

The digital signal processor is configured to process a digital signal, and may process another digital signal in addition to the digital image signal. For example, when the terminal 100 selects a frequency, the digital signal processor is configured to perform Fourier transform and the like on frequency energy.

The video codec is configured to: compress or decompress a digital video. The terminal 100 may support one or more video codecs. In this way, the terminal 100 can play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a structure of a biological neural network, for example, a transfer mode between human brain neurons, and may further continuously perform self-learning. Applications such as intelligent cognition of the terminal 100 may be implemented by using the NPU, for example, image recognition, facial recognition, speech recognition, and text understanding.

The external memory interface 120 may be configured to connect to an external memory card such as a micro SD card, to extend a storage capability of the terminal 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (for example, audio data and an address book) created during use of the terminal 100, and the like. In addition, the internal memory 121 may include a high-speed random access memory, and may further include a nonvolatile memory, for example, at least one magnetic disk storage device, a flash memory device, or a universal flash storage (UFS). The processor 110 executes various functional applications and data processing of the terminal 100 by running an instruction stored in the internal memory 121 and/or an instruction stored in the memory disposed in the processor.

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to: code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The terminal 100 may listen to music or answer a hands-free call by using the speaker 170A.

The receiver 170B, also referred to as an "earpiece", is configured to convert an electrical audio signal into a sound signal. When a call is answered or audio information is listened to by using the terminal 100, the receiver 170B may be put close to a human ear to listen to a voice.

The microphone 170C, also referred to as a "mike" or a "mic", is configured to convert a sound signal into an electrical signal. When making a call or sending voice information, the user may place the mouth of the user near the microphone 170C to make a sound, to input a sound signal to the microphone 170C. At least one microphone 170C may be disposed in the terminal 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, reduce noise, further identify a sound source, implement a directional recording function, and the like.

The headset jack 170D is configured to connect to a wired headset. The headset jack 170D may be the USB interface 130, or may be a 3.5 mm open mobile terminal platform (OMTP) standard interface or cellular telecommunications industry association of the USA (CTIA) standard interface.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be configured to produce an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The terminal 100 interacts with a network through a SIM card, to implement functions such as calling and data communication. In some embodiments, the terminal 100 uses an eSIM, namely, an embedded SIM card. The eSIM card may be embedded in the terminal 100, and cannot be separated from the terminal 100.

A software system of the terminal 100 may use a layered architecture, an event-driven architecture, a microkernel architecture, a microservice architecture, or a cloud architecture. In this embodiment of the present invention, an Android system with the layered architecture is used as an example to illustrate a software structure of the terminal 100.

Figure 2A:
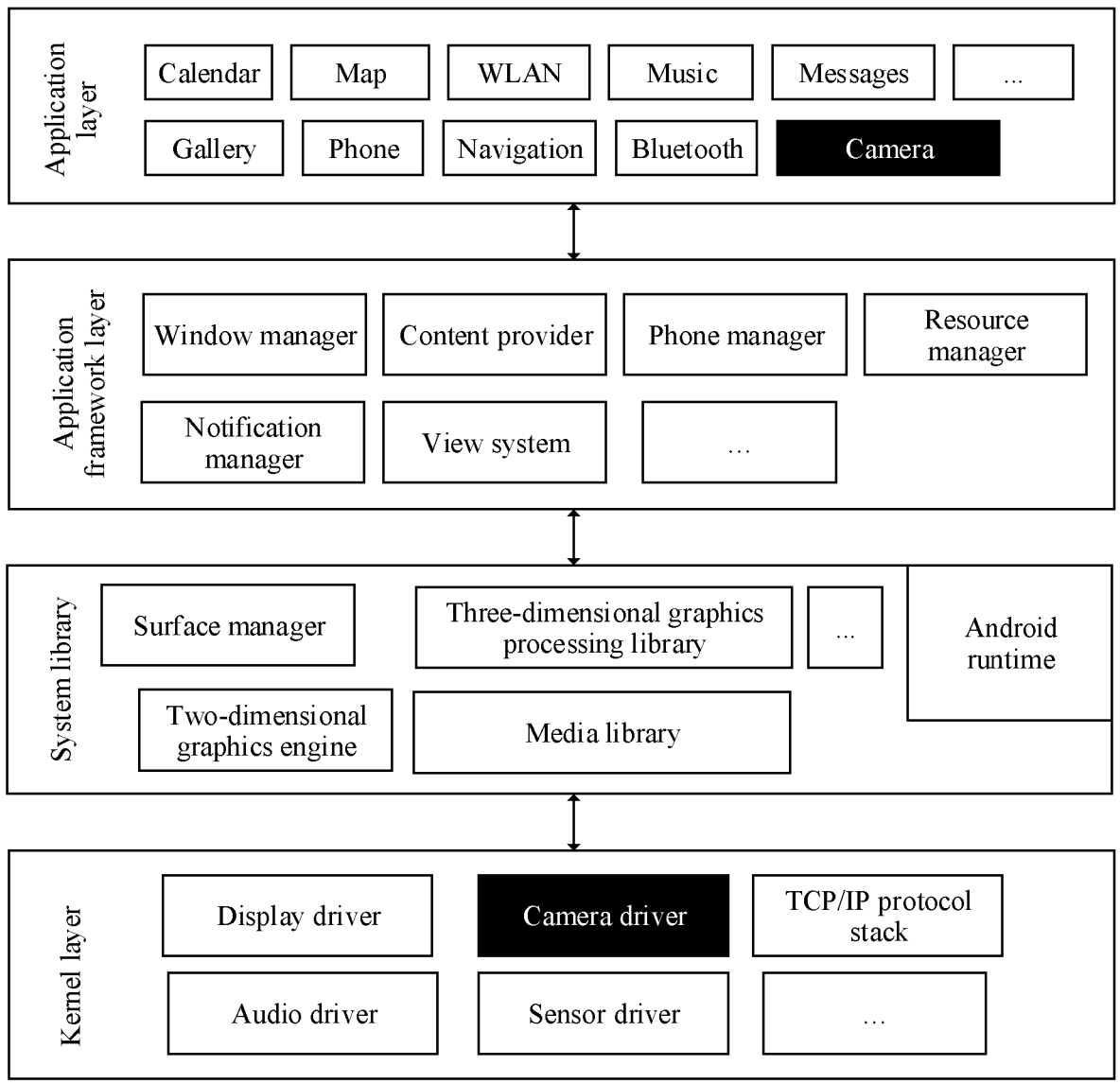
FIG. 2A is a schematic diagram of a structure of another terminal according to an embodiment of this disclosure.

FIG. 2A is a block diagram of a software structure of the terminal 100 according to an embodiment of the present invention.

In a layered architecture, software is divided into several layers, and each layer has a clear role and task. The layers communicate with each other through a software interface. In some embodiments, the Android system is divided into four layers, namely, an application layer, an application framework layer, an Android runtime and system library, and a kernel layer from top to bottom.

As shown in FIG. 2A, the application layer may include a series of application packages, including an application preset before the terminal is delivered from the factory, or an application installed by a user in, for example, an application marketplace or another manner after the terminal is delivered from the factory. These applications include but are not limited to applications such as Camera, Gallery, Calendar, Phone, Map, Navigation, WLAN, Bluetooth, Music, Video, Messages, and Browser (only some are shown in the figure).

Figure 2B:
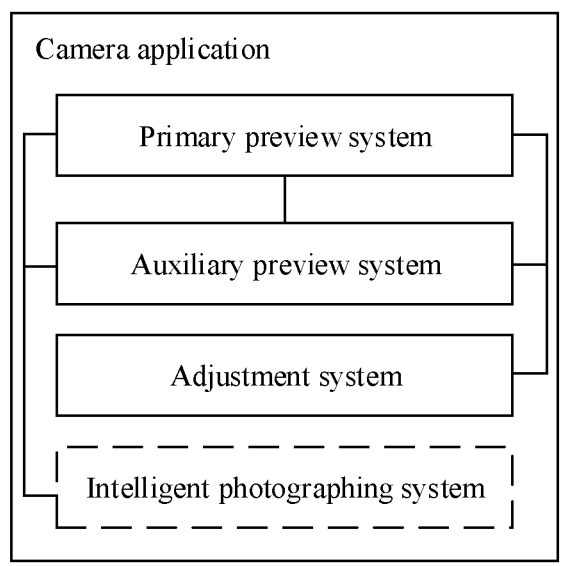
FIG. 2B is a schematic diagram of a structure of still another terminal according to an embodiment of this disclosure.

In some embodiments of this application, as shown in FIG. 2B, the camera application may include a primary preview system, an auxiliary preview system, and an adjustment system. The primary preview system may perform corresponding processing based on an image captured by a long-focus camera, to obtain a primary preview image of a first viewfinder frame. The auxiliary preview system may perform corresponding processing based on an image captured by a medium-focus camera or a wide-angle camera to obtain an auxiliary preview image of a second viewfinder frame, to assist a user in determining a framing range of the primary preview image. For example, the user may move a position of a mobile phone to change the framing range of the primary preview image, or the user may not move the position of the mobile phone, and the adjustment system is used for processing to change the framing range of the primary preview image. The adjustment system may perform related processing on the primary preview image and the auxiliary preview image based on an adjustment operation (for example, tapping an adjustment control or dragging the second viewfinder frame) performed by the user, to change the framing range of the primary preview image.

In some other embodiments of this application, as shown in FIG. 2B, the camera application may further include an intelligent photographing system. The intelligent photographing system may generate an object locking interface based on an image captured by the medium-focus camera or the wide-angle camera, so that the user selects to lock a target photographing object. Then, the intelligent photographing system may calculate a recommended zoom magnification based on factors such as positions and areas of one or more locked target photographing objects, a sequence of locking the target object, and a type of the locked target object, and recommend the recommended zoom magnification to the user.

The application framework layer provides an application programming interface (API) and a programming framework for an application at the application layer. The application framework layer includes some predefined functions.

The application framework layer may further include a window manager, a content provider, a view system, a phone manager, a resource manager, a notification manager, and the like. The window manager is configured to manage a window program. The window manager may obtain a size of a display, determine whether there is a status bar, perform screen locking, take a screenshot, and the like. The content provider is configured to: store and obtain data, and enable the data to be accessed by an application. The data may include a video, an image, audio, calls that are made and received, a browsing history, a bookmark, an address book, and the like. The view system includes a visual control s, such as a control for displaying a text or a control for displaying a picture. The view system may be configured to construct an application. A display interface may include one or more views. For example, a display interface including an SMS message notification icon may include a text display view and a picture display view. The phone manager is configured to provide a communication function of the terminal 100, for example, management of call statuses (including answering, declining, and the like). The resource manager provides various resources such as a localized character string, an icon, a picture, a layout file, and a video file for an application. The notification manager enables an application to display notification information in a status bar, and may be configured to convey a notification message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an alert tone is made, the terminal vibrates, and an indicator light flashes.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library, a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap operation and a control corresponding to the single-tap operation is a control of a camera application icon. The camera application invokes an interface at the application framework layer, so that the camera application is opened. Then, the camera driver is started by invoking the kernel layer, and a static image or a video is captured by using the camera 193.

All technical solutions in the following embodiments may be implemented in the terminal 100 having the hardware architecture shown in FIG. 1 and the software architecture shown in FIG. 2A. The following uses an example in which the terminal 100 is a mobile phone to describe in detail the technical solutions provided in embodiments of this application with reference to the accompanying drawings.

1. Start a Camera and Enter a Photo Mode.

Figure 3A:
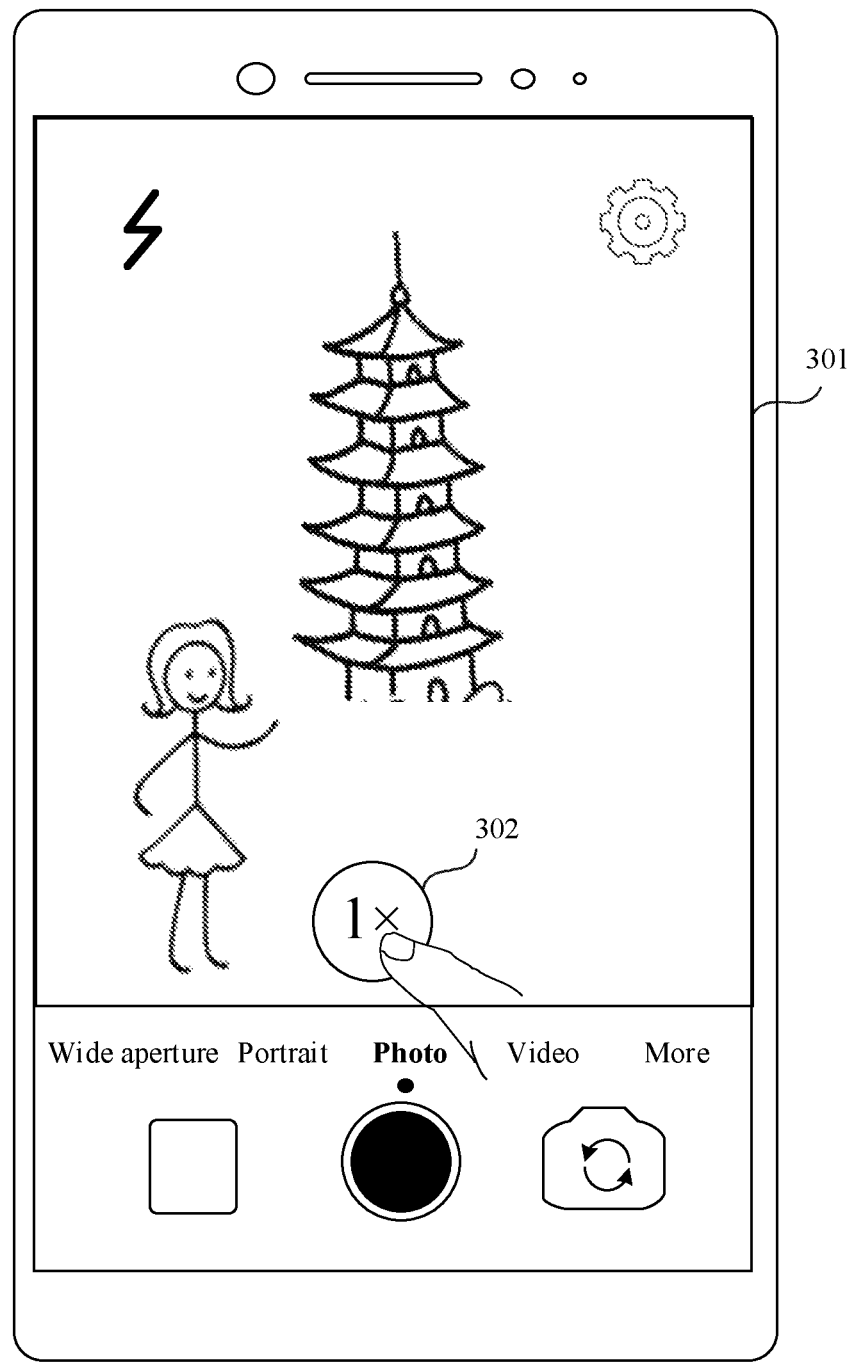
FIG. 3A to FIG. 3D are schematic diagrams of some user interfaces of a terminal according to an embodiment of this disclosure.
Figure 3B:
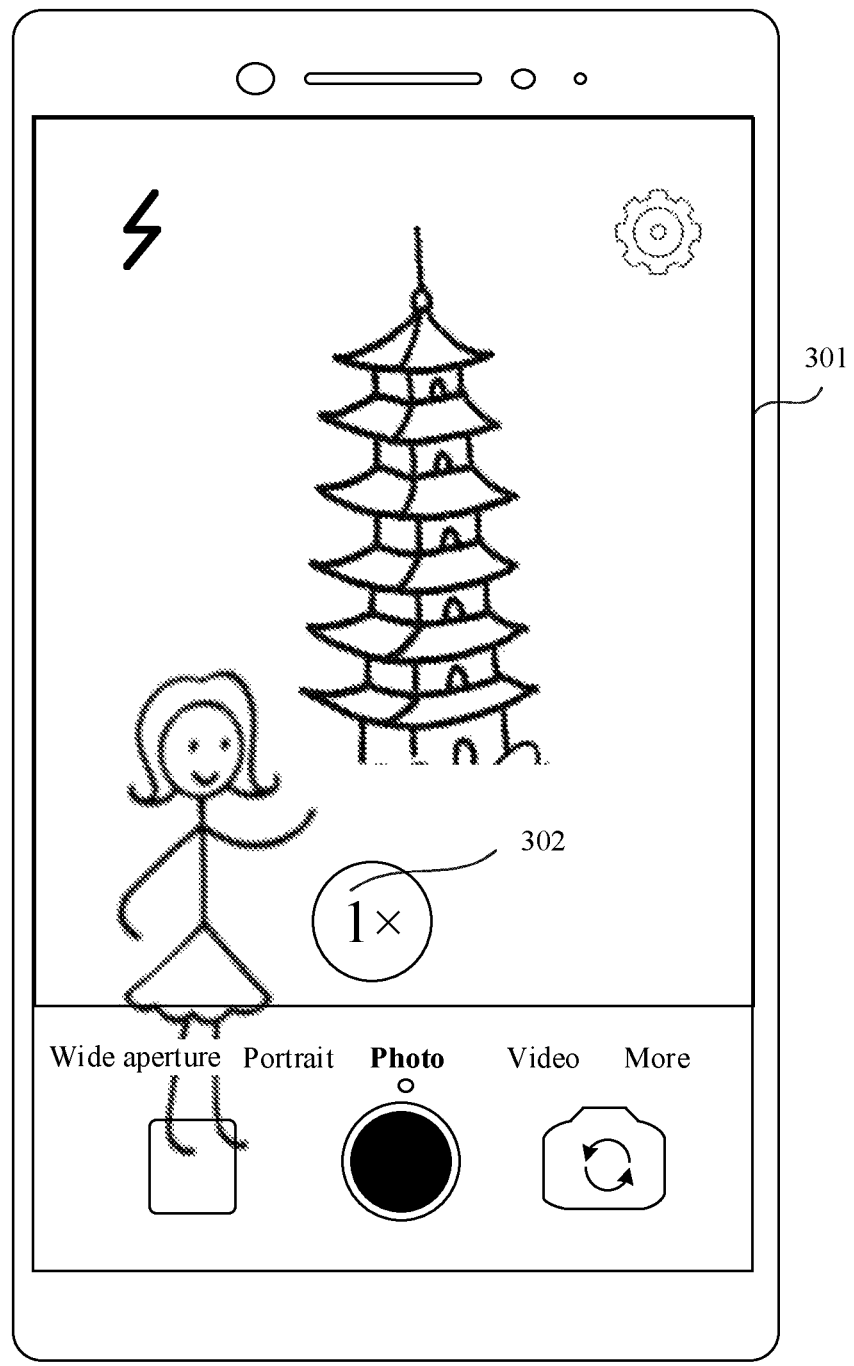

For example, a user may indicate the mobile phone to start a camera application by touching a specific control on a screen of the mobile phone, pressing a specific physical button or a button combination, entering a voice, or making an air gesture. In response to receiving the user's indication to start the camera, the mobile phone starts the camera, and displays a photographing interface shown in FIG. 3A. The photographing interface includes a first viewfinder frame 301, a photographing control, and other function controls ("Wide aperture", "Portrait", "Photo", "Video", or the like). The first viewfinder frame 301 is configured to preview an image captured by a current camera. The user may determine, based on the preview image in the first viewfinder frame 301, an occasion for indicating the mobile phone to perform a photographing operation. The user indicating the mobile phone to perform a photographing operation may be, for example, an operation in which the user taps a photographing control, or an operation in which the user presses a volume button. In some examples, the user may change a resolution of the camera to change a size of the first viewfinder frame 301 in the screen of the mobile phone. For example, as shown in FIG. 3A, if the resolution of the camera is a first resolution, the first viewfinder frame 301 occupies a part of the screen of the mobile phone. The first viewfinder frame 301 does not overlap the photographing control, the other function controls, or the like. For another example, as shown in FIG. 3B, if the resolution of the camera is a second resolution, and the second resolution is greater than the first resolution, the first viewfinder frame 301 occupies the entire screen of the mobile phone. The first viewfinder frame 301 overlaps the photographing control, the other function controls, and the like.

In some embodiments, the photographing interface further includes a zoom indication control 302. Generally, when the mobile phone just starts the camera application, a zoom magnification is "1×" by default. In another example, the mobile phone may hide the zoom magnification control 302 when the zoom magnification is "1×". When the zoom magnification of the mobile phone is not "1×", the zoom magnification control 302 is displayed, to notify the user of a current zoom magnification.

The zoom magnification may be understood as a zoom-out/zoom-in ratio of a focal length of the current camera to a reference focal length. The reference focal length is usually a focal length of a primary camera of the mobile phone.

An example in which the mobile phone integrates three cameras: a short-focus (wide-angle) camera, a medium-focus camera, and a long-focus camera is used for description. When relative positions of the mobile phone and a to-be-photographed object remain unchanged, the short-focus (wide-angle) camera has a smallest focal length and a largest field of view, and corresponds to a smallest size of an object in a photographed image. A focal length of the medium-focus camera is larger than that of the short-focus (wide-angle) camera, a field of view of the medium-focus camera is smaller than that of the short-focus (wide-angle) camera, and a size of an object in a photographed image of the medium-focus camera is larger than that of the short-focus (wide-angle) camera. The long-focus camera has a largest focal length and a smallest field of view, and corresponds to a largest size of an object in a photographed image.

The field of view is used to indicate a maximum angle range that can be photographed by the camera in a process of photographing an image by the mobile phone. That is, if a to-be-photographed object is within this angle range, the to-be-photographed object can be captured by the mobile phone. If the to-be-photographed object is outside the angle range, the to-be-photographed object cannot be captured by the mobile phone. Usually, a larger field of view of a camera indicates a larger photographing range of the camera, and a smaller field of view of a camera indicates a smaller photographing range of the camera. It may be understood that "field of view" may also be replaced with words such as "vision range", "view range", "field of vision", "imaging range" or "imaging field of view".

Usually, the user uses the medium-focus camera in most scenarios. Therefore, the medium-focus camera is usually set as the primary camera. The focal length of the primary camera is set to the reference focal length, and the zoom magnification is set to "1×". In some embodiments, digital zoom (digital zoom) may be performed on an image captured by the primary camera, that is, each pixel area of a "1×" image captured by the primary camera is enlarged by using an ISP or another processor in the mobile phone, and a framing range of the image is correspondingly shrunk, so that a processed image is equivalent to an image photographed by using the primary camera at another zoom magnification (for example, "2×"). That is, the image photographed by using the primary camera may correspond to a zoom magnification range, for example, "0.8×" to "11×".

Similarly, the focal length of the long-focus camera divided by the focal length of the primary camera may be used as a zoom magnification of the long-focus camera. For example, the focal length of the long-focus camera may be 5 times the focal length of the primary camera, that is, the zoom magnification of the long-focus camera is "5×". Similarly, digital zoom may also be performed on an image captured by the long-focus camera. That is, the image photographed by using the long-focus camera may correspond to another zoom magnification range, for example, "10×" to "50×".

Similarly, the focal length of the short-focus (wide-angle) camera divided by the focal length of the primary camera may be used as a zoom magnification of the short-focus (wide-angle) camera. For example, the focal length of the short-focus camera may be 0.5 times the focal length of the primary camera, that is, the zoom magnification of the long-focus camera is "0.5×". Similarly, digital zoom may also be performed on an image captured by the short-focus (wide-angle) camera. That is, the image photographed by using the long-focus camera may correspond to another zoom magnification range, for example, "0.5×" to "1×".

Certainly, the mobile phone may use any one of the cameras as the primary camera, and use the focal length of the primary camera as the reference focal length. This is not specifically limited in this application.

2. Enter a Long-Focus Photographing Mode and Display an Auxiliary Preview Image.

In an actual photographing scenario, the short-focus (wide-angle) camera and the medium-focus camera are mainly used to photograph a to-be-photographed object that is relatively close to a position of the mobile phone. The long-focus camera is generally used to photograph a to-be-photographed object that is relatively far away from the position of the mobile phone. Certainly, in some scenarios, the to-be-photographed object that is relatively far away from the position of the mobile phone may alternatively be photographed by using a high zoom magnification of the medium-focus camera. In this embodiment of this application, the long-focus photographing mode (or a long-focus photographing scenario) may be understood as a photographing scenario in which the zoom magnification of the mobile phone is greater than or equal to a preset magnification (for example, "10×", "20×"). In the long-focus photographing mode, the mobile phone may use an image photographed by the medium-focus camera, or may use an image photographed by the long-focus camera. This is not specifically limited in this embodiment of this application.

Herein, a framing range of the first viewfinder frame in the long-focus photographing mode is referred to as a long-focus framing range for short. A target photographing object may move out of the long-focus framing range due to manual shaking of the user or movement of the target photographing object. The user needs to search for the target photographing object by moving the mobile phone. Because the user does not know a direction and a distance of a current target photographing object relative to the long-focus framing range, the user usually needs to repeatedly change a moving direction and a moving distance of the mobile phone. In addition, a relatively small moving distance of the mobile phone may cause a relatively large movement of the long-focus framing range, which increases difficulty and duration for the user to find the target photographing object. Therefore, this embodiment of this application provides an auxiliary preview image whose framing range is greater than a long-focus auxiliary framing range, so that the user observes, from the auxiliary preview image, a direction and a distance of the target photographing object relative to the long-focus framing range of the mobile phone, to indicate the user to move the mobile phone. In addition, when the target photographing object is relatively close to the long-focus framing range, the user may further accurately control a moving direction and a moving distance of the long-focus framing range by using the auxiliary framing preview image, so that the target photographing object accurately moves into the long-focus framing range. In addition, when the target photographing object is in the long-focus framing range, the user may also implement precise photographing composition by using the auxiliary preview image.

In some embodiments, the mobile phone may enable a function of the auxiliary preview image by default. In this case, when the zoom magnification of the mobile phone is greater than or equal to the preset magnification, the mobile phone displays the auxiliary preview image. Certainly, when the mobile phone displays the auxiliary preview image, the user may also manually disable the auxiliary preview image. When the zoom magnification of the mobile phone is less than the preset magnification, the mobile phone does not display the auxiliary preview image.

In some other embodiments, the mobile phone may alternatively set a switch control, to enable or disable the function of the auxiliary preview image. The mobile phone may set the switch control in a setting option of the camera application, or may set the switch control on a photographing interface in the long-focus photographing mode. This is not limited in this embodiment. Certainly, the user may further enable or disable the function of the auxiliary preview image in another manner, for example, by using a voice command, using an air gesture, pressing a physical button or a combination of physical buttons.

For example, the mobile phone sets the function of the auxiliary preview image in the setting option of the camera application. In this case, if the user enables the function of the auxiliary preview image by using the switch control, the mobile phone displays the auxiliary preview image when the zoom magnification of the mobile phone is greater than or equal to the preset magnification, or the mobile phone does not display the auxiliary preview image when the zoom magnification of the mobile phone is less than the preset magnification. If the user disables the function of the auxiliary preview image by using the switch control, the mobile phone does not display the auxiliary preview image when the zoom magnification of the mobile phone is greater than or equal to the preset magnification.

For another example, the mobile phone sets the function of the auxiliary preview image on the photographing interface in the long-focus photographing mode. In this case, when the zoom magnification of the mobile phone is greater than or equal to the preset magnification, the photographing interface of the mobile phone displays the switch control or the switch control is available. If the user enables the function of the auxiliary preview image by using the switch control, the mobile phone displays the auxiliary preview image. In an example, when the mobile phone exits the long-focus photographing mode, the mobile phone does not display the auxiliary preview image when entering the long-focus photographing scenario again. In another example, when the mobile phone exits the long-focus photographing mode, the mobile phone still displays the auxiliary preview image when entering the long-focus photographing mode again. After the mobile phone exits the camera application, the mobile phone does not display the auxiliary preview image when the mobile phone enables the camera application again and enters the long-focus photographing mode.

An example in which the mobile phone enables the function of the auxiliary preview image by default is provided for reference.

The user may tap the zoom indication control 302 on the photographing interface shown in FIG. 3A for one or more times, to increase the zoom magnification of the mobile phone. Certainly, the user may alternatively perform an operation of swiping outward with two fingers on the first viewfinder frame 301, or adjust a zoom ruler to increase the zoom magnification of the mobile phone.

Figure 3C:
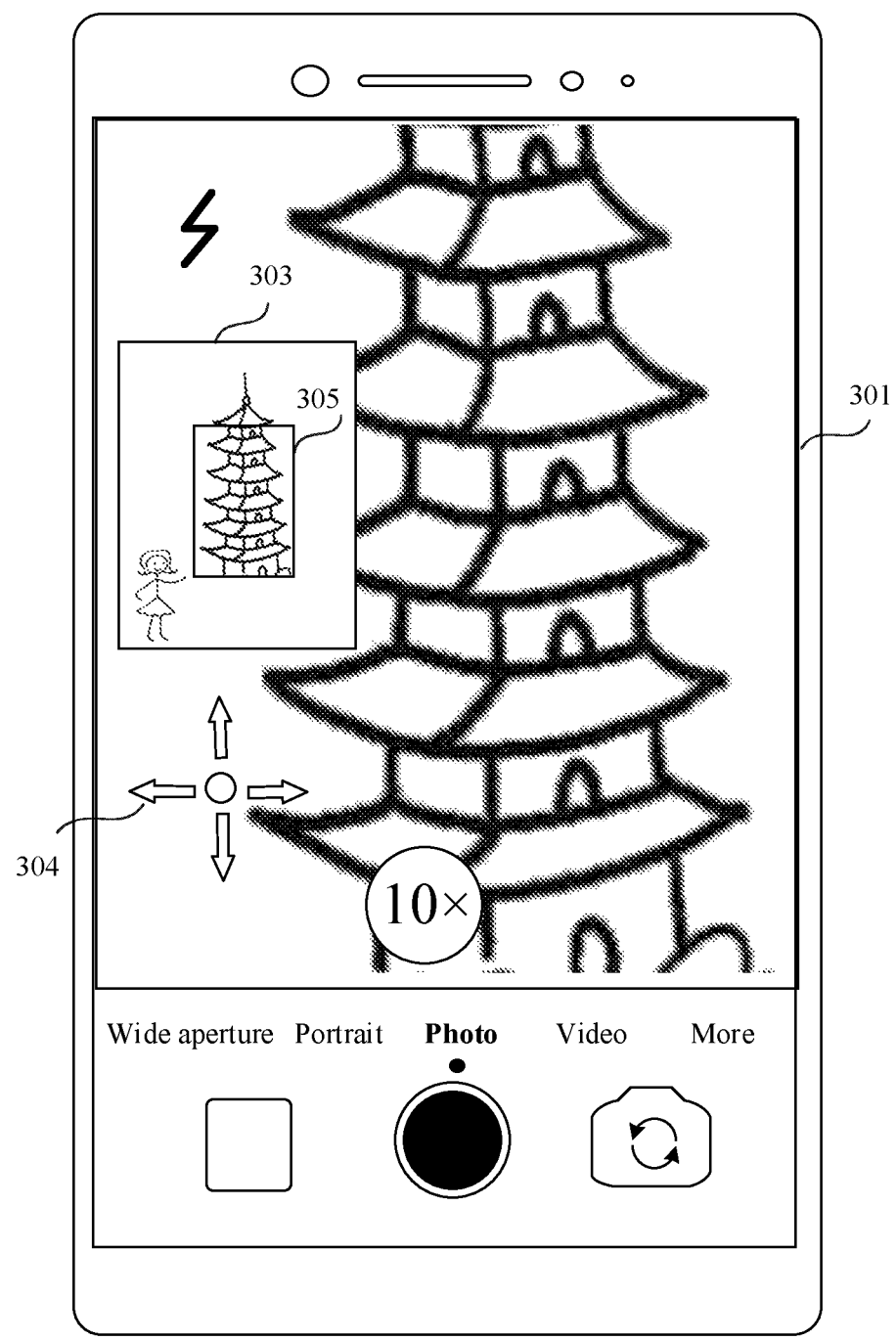

When the user increases the zoom magnification of the mobile phone to the preset magnification or a value greater than the preset magnification, the mobile phone displays a photographing interface shown in FIG. 3C. The photographing interface further displays a second viewfinder frame 303 in addition to displaying the first viewfinder frame 301, the zoom indication control 302, the photographing control, and the other function controls ("Wide aperture", "Portrait", "Photo", "Video", or the like). The second viewfinder frame 303 is used to assist the user in determining a framing range of the first viewfinder frame 301.

A framing range of the second viewfinder frame 303 is greater than the framing range of the first viewfinder frame 301. In other words, a zoom magnification corresponding to the second viewfinder frame 303 is less than a zoom magnification corresponding to the first viewfinder frame 301. For example, the zoom magnification corresponding to the second viewfinder frame 303 is "1×". In some examples, the zoom magnification corresponding to the second viewfinder frame 303 is a fixed value. For example, the zoom magnification is "1×". In some other examples, the zoom magnification corresponding to the second viewfinder frame 303 may change with the zoom magnification corresponding to the first viewfinder frame 301. For example, when the zoom magnification corresponding to the first viewfinder frame 301 is in a first interval (for example, greater than or equal to "10×" and less than "30×"), the zoom magnification corresponding to the second viewfinder frame 303 is a magnification A. When the zoom magnification corresponding to the first viewfinder frame 301 is in a second interval (for example, greater than or equal to "30×" and less than "50×"), the zoom magnification corresponding to the second viewfinder frame 303 is a magnification B. The magnification B is greater than the magnification A. For another example, when the zoom magnification corresponding to the first viewfinder frame 301 is in the first interval (for example, greater than or equal to "10×" and less than "30×"), the zoom magnification corresponding to the second viewfinder frame 303 is the magnification A. When the zoom magnification corresponding to the first viewfinder frame 301 is in the second interval (for example, greater than or equal to "30×" and less than "50×"), the zoom magnification corresponding to the second viewfinder frame 303 proportionally changes with the zoom magnification corresponding to the first viewfinder frame 301.

For ease of distinguishing, the preview image in the first viewfinder frame 301 is referred to as a primary preview image. A preview image in the second viewfinder frame 303 is the auxiliary preview image. Resolution of the auxiliary preview image may be the same as or different from resolution of the primary preview image.

In some embodiments, a first mark frame 305 is displayed in the auxiliary preview image, and is used to mark the framing range of the first viewfinder frame 301 in the auxiliary preview image. For example, as shown in FIG. 3C, the primary preview image in the first viewfinder frame 301 includes only a part of a "tower". The auxiliary preview image in the second viewfinder frame 303 includes a "person" and a "tower", but a size of the "tower" in the auxiliary preview image is less than a size of the "tower" in the primary preview image. It can be seen that an area selected by the first mark frame 305 in the auxiliary preview image is the same as a framing range corresponding to the primary preview image.

In a specific implementation method, the primary preview image and the auxiliary preview image may be images captured by a same camera (for example, the primary camera) of the mobile phone. The mobile phone may correspondingly crop, based on a current zoom magnification K1 (for example, "10×") of the mobile phone, a raw image captured by the camera, and perform digital zoom to obtain the primary preview image. The mobile phone may correspondingly crop, based on a set zoom magnification K2 (for example, "1×") of the auxiliary preview image, the raw image captured by the camera, and perform digital zoom to obtain the auxiliary preview image. Further, a position of the first mark frame 305 in the auxiliary preview image is determined based on the zoom magnification K1 corresponding to the primary preview image and the zoom magnification K2 corresponding to the auxiliary preview image. The first mark frame 305 is in a center position of the auxiliary preview image and occupies $(K2/K1)^2$ of a total area of the auxiliary preview image.

In another specific implementation method, the primary preview image and the auxiliary preview image may be images captured by different cameras (for example, the primary camera and the long-focus camera) from a same side of the mobile phone. The mobile phone may correspondingly crop, based on a current zoom magnification K1 (for example, "10×") of the mobile phone, a raw image captured by the long-focus camera, and perform digital zoom to obtain the primary preview image. The mobile phone may correspondingly crop, based on a set zoom magnification K2 (for example, "1×") of the auxiliary preview image, a raw image captured by the primary camera, and perform digital zoom to obtain the auxiliary preview image. Further, a position of the first mark frame 305 in the auxiliary preview image is determined based on the zoom magnification K1 corresponding to the primary preview image and the zoom magnification K2 corresponding to the auxiliary preview image. The first mark frame 305 is in a center position of the auxiliary preview image and occupies $(K2/K1)^2$ of a total area of the auxiliary preview image.

It can be learned from the foregoing that an area of the first mark frame 305 in the auxiliary preview image is proportional to the zoom magnification K2 of the auxiliary preview image, and is inversely proportional to the zoom magnification of the primary preview image. In an example, if the zoom magnification of the auxiliary preview image is a fixed value, a size of the first mark frame 305 decreases as the zoom magnification of the primary preview image increases. In another example, when the zoom magnification of the primary preview image is greater than a threshold, the zoom magnification of the auxiliary preview image may increase. In this case, the size of the first mark frame 305 may remain unchanged, or may be appropriately increased, so that it is convenient for the user to view an object in the first mark frame 305, and it is convenient to subsequently adjust the framing range of the primary preview image based on the auxiliary preview image.

In this case, the user may perform image composition design on the primary preview image based on more scenes in the auxiliary preview image with a larger framing range. Alternatively, when the target photographing object is not in the primary preview image, the user may move the mobile phone based on a position of the target photographing object in the auxiliary preview image, so that the target photographing object can return to the primary preview image.

3. Keep the Position of the Mobile Phone Unchanged and Adjust the Framing Range Corresponding to the Primary Preview Image.

If it is observed in the auxiliary preview image that the target photographing object is relatively close to the position of the first mark frame 305, or the target photographing object is relatively close to the position of the first mark frame 305 when the user first manually moves the mobile phone, the user may no longer move the mobile phone, but adjust the framing range of the first viewfinder frame 301, to move the target photographing object into the primary preview image of the first viewfinder frame 301. Alternatively, when the user needs to perform fine adjustment on the scene in the primary preview image to achieve better image composition, the user may adjust the framing range of the first viewfinder frame 301.

In some embodiments, FIG. 3C shows a photographing interface A in a long-focus scenario. A group of adjustment controls 304 may be further displayed, to adjust the framing range of the first viewfinder frame 301. The group of adjustment controls 304 includes controls corresponding to a plurality of different directions (for example, up, down, left, right, upper left, lower left, upper right, and lower right).

Figure 3D:
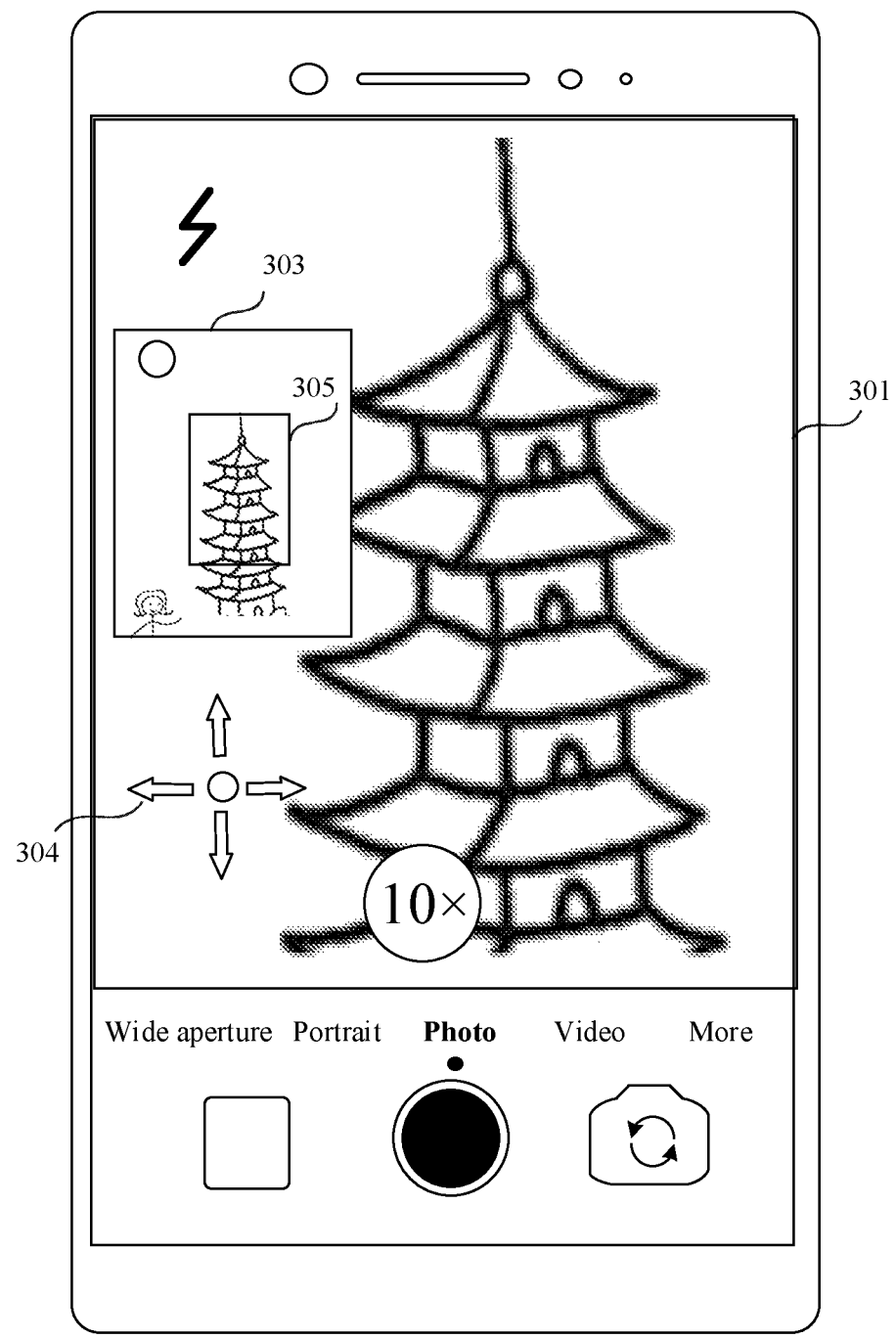

In some examples, if it is detected that the user taps a control for moving upward on the photographing interface A, the mobile phone moves framing ranges in the first viewfinder frame 301 and the second viewfinder frame 303 upward by a specific distance, to display a photographing interface B shown in FIG. 3D.

The photographing interface A is compared with the photographing interface B, and a primary preview image on the photographing interface B is an image above a primary preview image on the photographing interface A. For example, the primary preview image on the photographing interface B is an image of a tower top, and the primary preview image on the photographing interface A is an image of a middle tower body. Similarly, an auxiliary preview image on the photographing interface B is an image above an auxiliary preview image on the photographing interface A. For example, the auxiliary preview image on the photographing interface B includes a part of a "person", a "tower", and a "moon", and the auxiliary preview image on the photographing interface A includes a "person" and a "tower". However, the first mark frame 305 in the auxiliary preview image is still located in a center position of the auxiliary preview image.

Herein, an example in which the primary preview image is obtained based on the image captured by the primary camera of the mobile phone, and the auxiliary preview image is obtained based on the image captured by the long-focus camera of the mobile phone is used, to describe specific implementation of adjusting, by the user by operating the adjustment controls 304, the framing range corresponding to the primary preview image in this example.

As shown in FIG. 4A, a raw image captured by a primary camera corresponds to a zoom magnification K0 (for example, "0.8×"). An image in a central area of the raw image is cropped based on a set zoom magnification K2 (for example, "1×") of an auxiliary preview image, and digital zoom is performed to obtain an auxiliary preview image shown in FIG. 4B. Further, a position of a first mark frame in the auxiliary preview image is determined by using a center position of the auxiliary preview image as a center position of the first mark frame. A similar method is used to crop a raw image (not shown in the figure, and corresponding to a zoom magnification K3 (for example, "8×")) captured by a long-focus camera based on a current zoom magnification K1 (for example, "10×") of a mobile phone, and perform digital zoom to obtain an auxiliary preview image shown in FIG. 4C. It can be seen that a framing range of an image in the first mark frame in the auxiliary preview image is consistent with a framing range corresponding to a primary preview image.

After detecting that a user taps a control for moving upward, the mobile phone moves a framing range corresponding to the auxiliary preview image upward by a specific distance (for example, M pixels). For example, as shown in FIG. 4D, a position of M pixels above a center position of the raw image shown in FIG. 4A is used as the center position of the auxiliary preview image, and an image whose range is the same as a size corresponding to a zoom magnification of the auxiliary preview image is cropped. Then, digital zoom is performed on a cropped image to obtain a changed auxiliary preview image shown in FIG. 4E. Further, the position of the first mark frame in the auxiliary preview image is determined by using the center position of the auxiliary preview image as the center position of the first mark frame. A similar method is used to crop an image whose range is the same as a size corresponding to the zoom magnification K1 of the primary preview image by using a position of (K3/K0)*M pixels above the center position of the raw image (not shown in the figure) captured by the long-focus camera as a center position of the primary preview image, and perform digital zoom to obtain a changed primary preview image shown in FIG. 4F.

It should be noted that a raw image captured by a camera of the mobile phone is a full-size image, and then the mobile phone crops the full-size image based on a resolution, a zoom magnification, and the like of the camera, and performs digital zoom to obtain a preview image (including the primary preview image and the auxiliary preview image) displayed by the mobile phone. It should be noted that even if a preview image displayed by a terminal and a raw image captured by a camera of the terminal correspond to a same zoom magnification, in other words, zoom-in is not performed on the raw image, a size corresponding to the raw image is greater than a size corresponding to the preview image displayed by the terminal. Therefore, when the mobile phone and the camera are not moved, images in different areas in the raw image may be cropped, to achieve an effect of moving a framing range of the auxiliary preview image or the primary preview image.

It can be learned that a moving distance of the auxiliary preview image is limited to a range of a full-size image that can be captured by the primary camera. Correspondingly, a moving distance of the primary preview image is also limited to a range of a full-size image that can be captured by the long-focus camera. In some other examples, when the auxiliary preview image or the primary preview image moves to a limit in a direction, the mobile phone may prompt the user that the auxiliary preview image or the primary preview image cannot move towards the direction anymore.

Similarly, when the user taps a control for moving towards another direction, the mobile phone may correspondingly adjust the framing range corresponding to the primary preview image. It should be noted that, when zoom magnifications used by the mobile phone are different, distances by which the framing range corresponding to the auxiliary preview image and the framing range corresponding to the primary preview image move once towards a direction may be different. For example, a distance by which the framing range corresponding to the auxiliary preview image and the framing range corresponding to the primary preview image move once towards a direction is inversely proportional to a zoom magnification currently used by the mobile phone.

It should be noted that when the method is used to adjust the framing range corresponding to the primary preview image, the framing range corresponding to the auxiliary preview image correspondingly changes when a photographed scenario does not change. For example, before the adjustment, the auxiliary preview image shown in FIG. 4B does not display a "moon". After the adjustment, the auxiliary preview image shown in FIG. 4F displays the "moon".

Optionally, the adjustment controls 304 may further include a forward adjustment control and a backward adjustment control. If the user taps the forward adjustment control, the mobile phone zooms in the auxiliary preview image and the primary preview image, giving the user a feeling of moving forward. If the user taps the backward adjustment control, the mobile phone zooms out the auxiliary preview image and the primary preview image, giving the user a feeling of moving backward. It should be noted that, by using the forward and backward adjustment controls, a zoom ratio of the mobile phone is relatively small, and is less than a zoom ratio achieved by changing a zoom magnification of the mobile phone. In other words, the primary preview image and the auxiliary preview image may be finely adjusted by using the forward or backward adjustment control. In some examples, the forward and backward adjustment controls may be one control.

For example, on the photographing interface shown in FIG. 3C, the adjustment controls 304 includes a circle control, and the circle control may be a forward and backward adjustment control. If it is detected that the user performs a first operation (for example, touching and holding) on the circle control, the mobile phone zooms in the primary preview image and the auxiliary preview image at a specific ratio (for example, 0.2 times). If it is detected that the user performs a first operation (for example, tapping) on the circle control, the mobile phone zooms in the primary preview image and the auxiliary preview image at a specific ratio (for example, 0.2 times). Similarly, when zoom magnifications used by the mobile phone are different, ratios at which the auxiliary preview image and the primary preview image are zoomed in or zoomed out at a time may be different. For example, a ratio at which the auxiliary preview image and the primary preview image are zoomed in or zoomed out at a time is inversely proportional to the zoom magnification used by the mobile phone.

Figure 5:
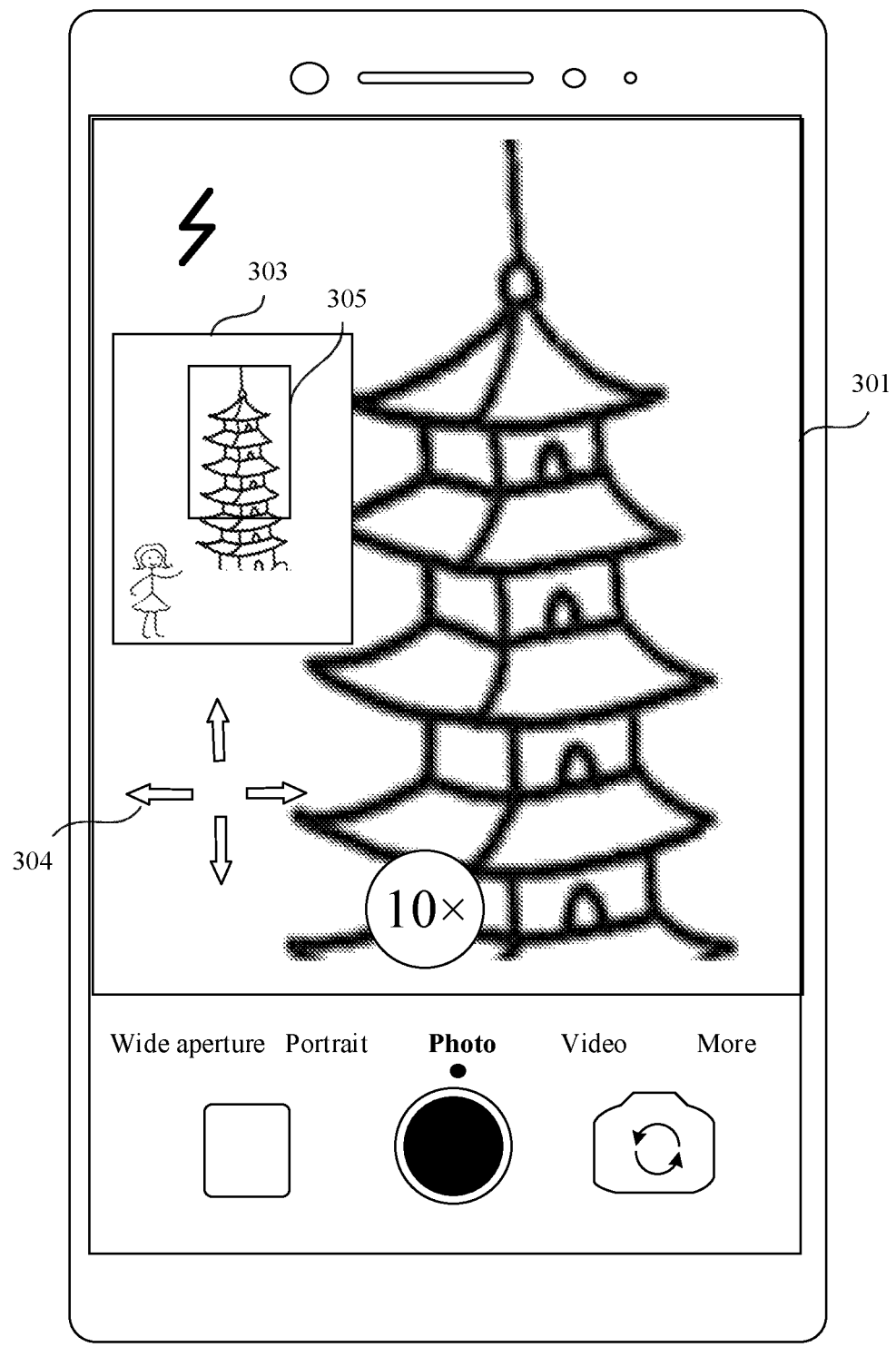
FIG. 5 is a schematic diagram of a user interface of a terminal according to an embodiment of this disclosure.

In some other examples, if it is detected that the user taps the control for moving upward on the photographing interface A shown in FIG. 3C, the mobile phone moves a framing range in the first viewfinder frame 301 upward by a specific distance, to display a photographing interface C shown in FIG. 5.

The photographing interface A is compared with the photographing interface C, and a primary preview image on the photographing interface C is an image above a primary preview image on the photographing interface A. For example, the primary preview image on the photographing interface C is an image of a tower top, and the primary preview image on the photographing interface A is an image of a middle tower body. The auxiliary preview image on the photographing interface C and the auxiliary preview image on the photographing interface A are the same, and both include a "person" and a "tower". However, the first mark frame 305 in the auxiliary preview image is no longer located in a center position of the auxiliary preview image, but is moved upward by a distance.

In this example, a primary preview image is obtained based on the image captured by the primary camera of the mobile phone, and the auxiliary preview image is obtained based on the image captured by the long-focus camera of the mobile phone is used, to describe specific implementation of adjusting, by the user by operating the adjustment controls 304, the framing range corresponding to the primary preview image in this example.

Figures 6A, 6B, 6C:
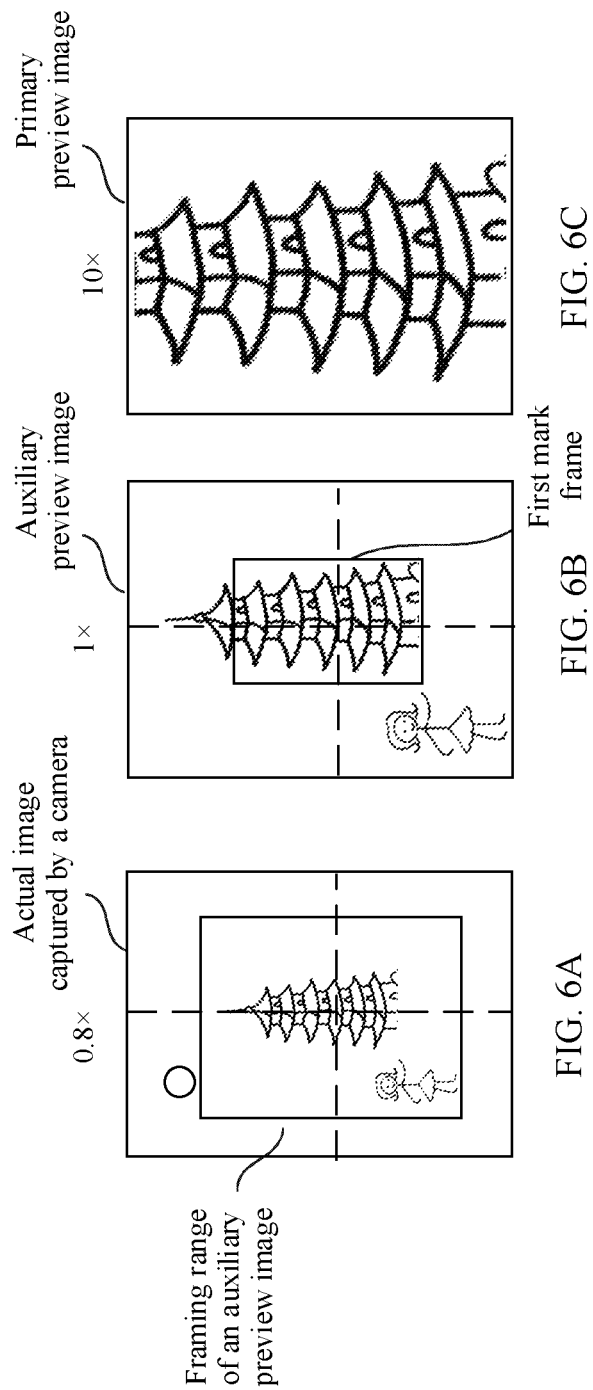

As shown in FIG. 6A, a raw image captured by a primary camera corresponds to a zoom magnification K0. As shown in FIG. 6B, an auxiliary preview image before adjustment corresponds to a zoom magnification K2. As shown in FIG. 6C, a primary preview image before adjustment corresponds to a zoom magnification K1. The primary preview image before adjustment is obtained by processing a raw image (corresponding to a zoom magnification K3) captured by a long-focus camera. For related processing, refer to the foregoing descriptions in FIG. 4A to FIG. 4C.

After it is detected that a user taps a control for moving upward, the auxiliary preview image remains unchanged, and a first mark frame in the auxiliary preview image is moved upward by a specific distance (for example, M pixels). For example, as shown in FIG. 6D, a center position of the raw image shown in FIG. 6A is used as a center position of the auxiliary preview image, and an image whose range is the same as a size corresponding to a zoom magnification of the auxiliary preview image is cropped. Then, digital zoom is performed on a cropped image to obtain a changed auxiliary preview image shown in FIG. 6E. Then, a position of the first mark frame in the auxiliary preview image is determined by using a position of M/K0 pixels above the center position of the auxiliary preview image as a center position of the first mark frame. A similar method is used to crop an image whose range is the same as a size corresponding to the zoom magnification K1 of the primary preview image by using a position of (K3/K0)*M pixels above the center position of the raw image (not shown in the figure) captured by the long-focus camera as a center position of the primary preview image, and perform digital zoom to obtain a changed primary preview image shown in FIG. 6F.

It should be noted that when the method is used to adjust a framing range corresponding to the primary preview image, when a photographed scenario does not change, a framing range corresponding to the auxiliary preview image does not change, but the position of the first mark frame in the auxiliary preview image changes.

For other content, refer to related descriptions in the foregoing example. Details are not described herein again.

In the foregoing embodiment, a method for adjusting the framing range corresponding to the primary preview image is described in a manner in which the user operates the adjustment controls 304. A specific adjustment operation method is not limited in this embodiment of this application. For example, the user may also adjust the framing range corresponding to the primary preview image by dragging the first mark frame in the auxiliary preview.

Figure 7A:
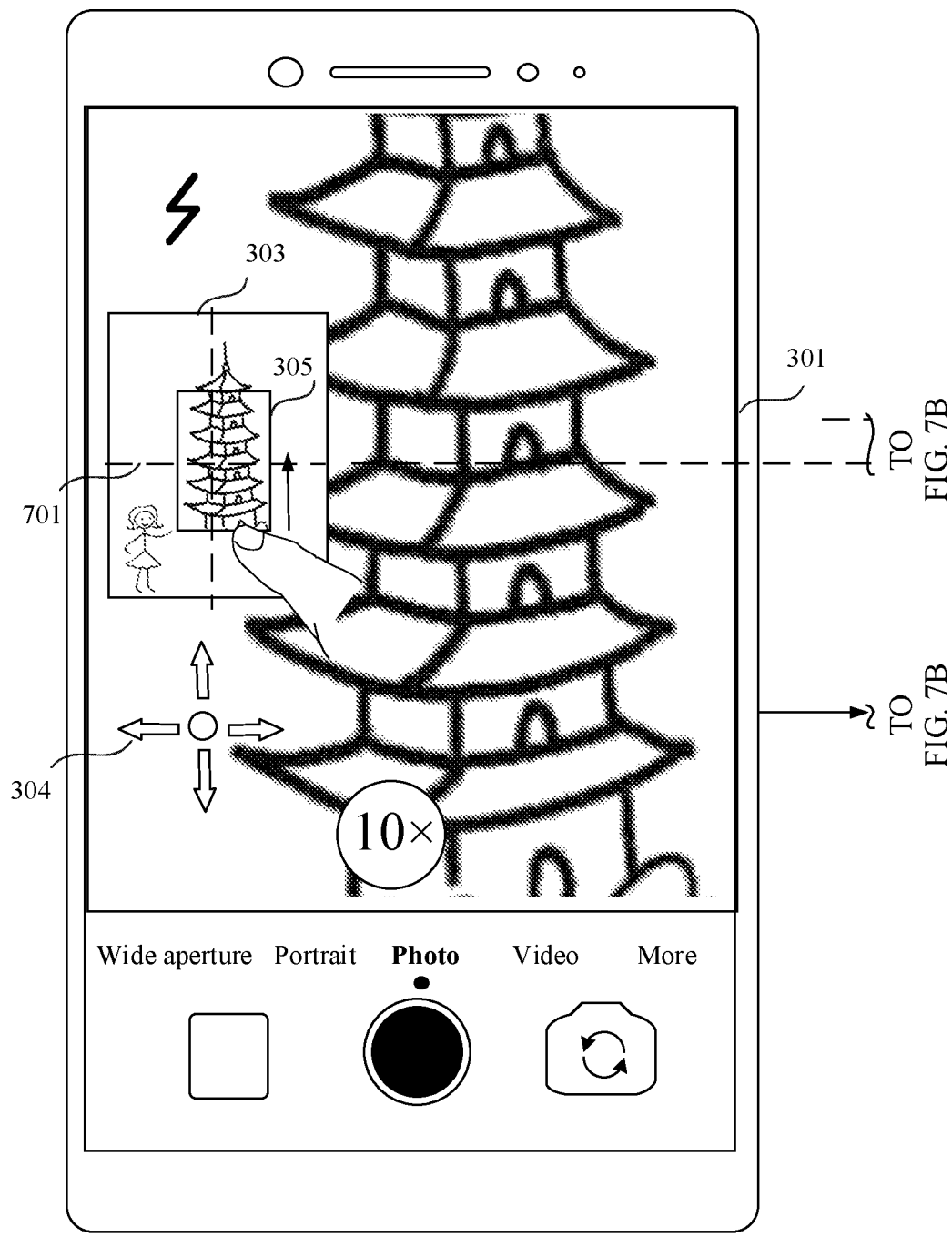
FIG. 7A to FIG. 7D are schematic diagrams of some other user interfaces of a terminal according to an embodiment of this disclosure.
Figure 7B:
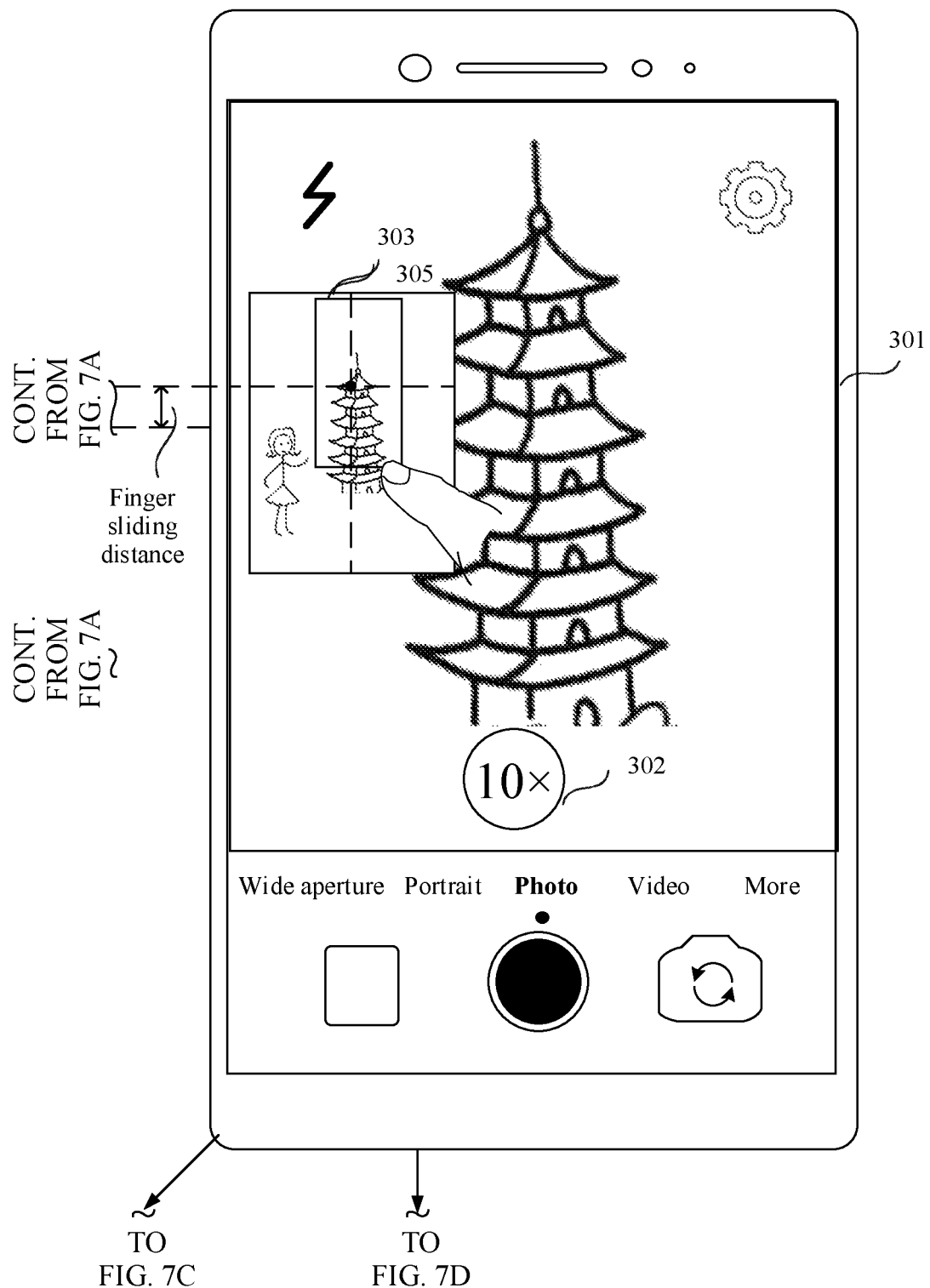
Figure 7C:
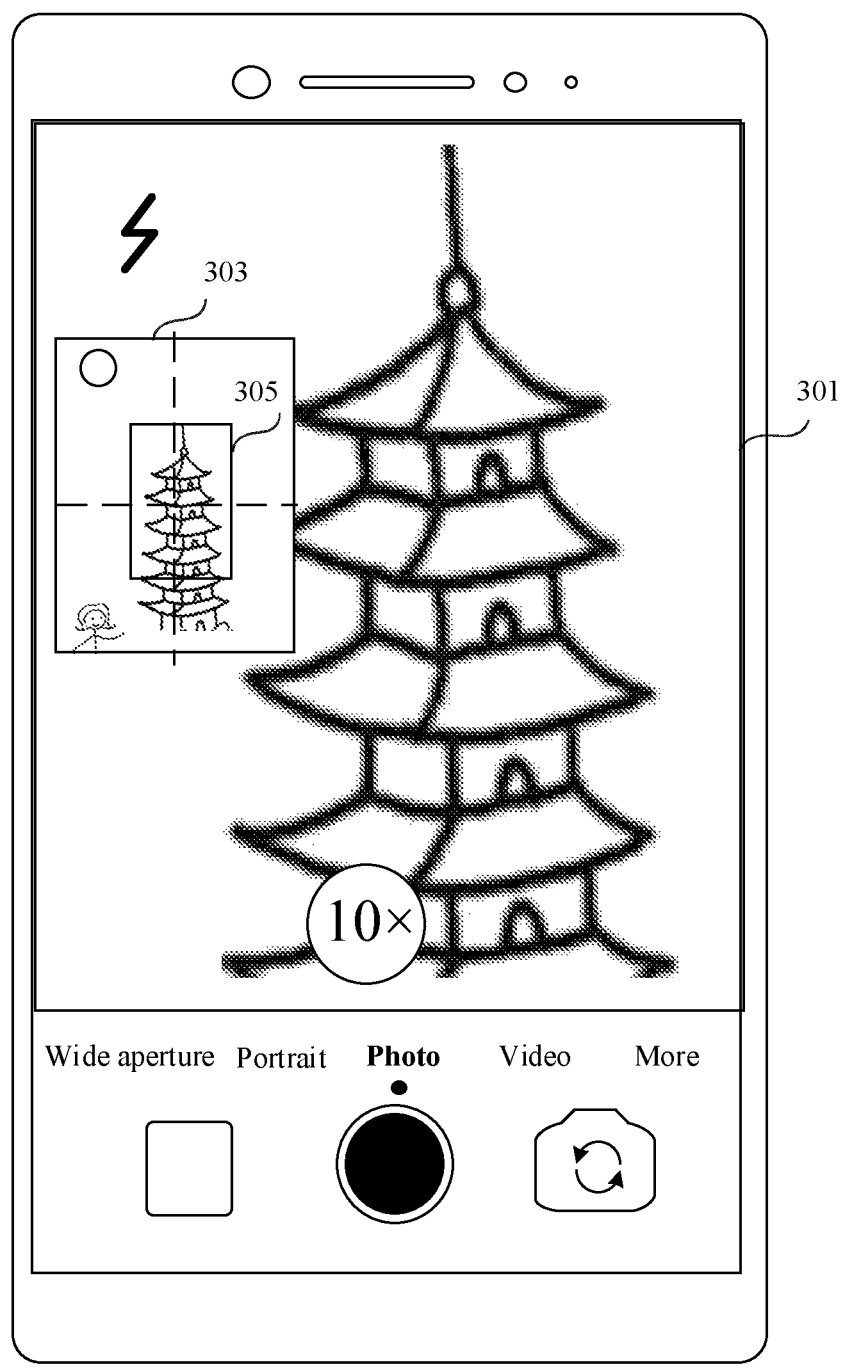
Figure 7D:
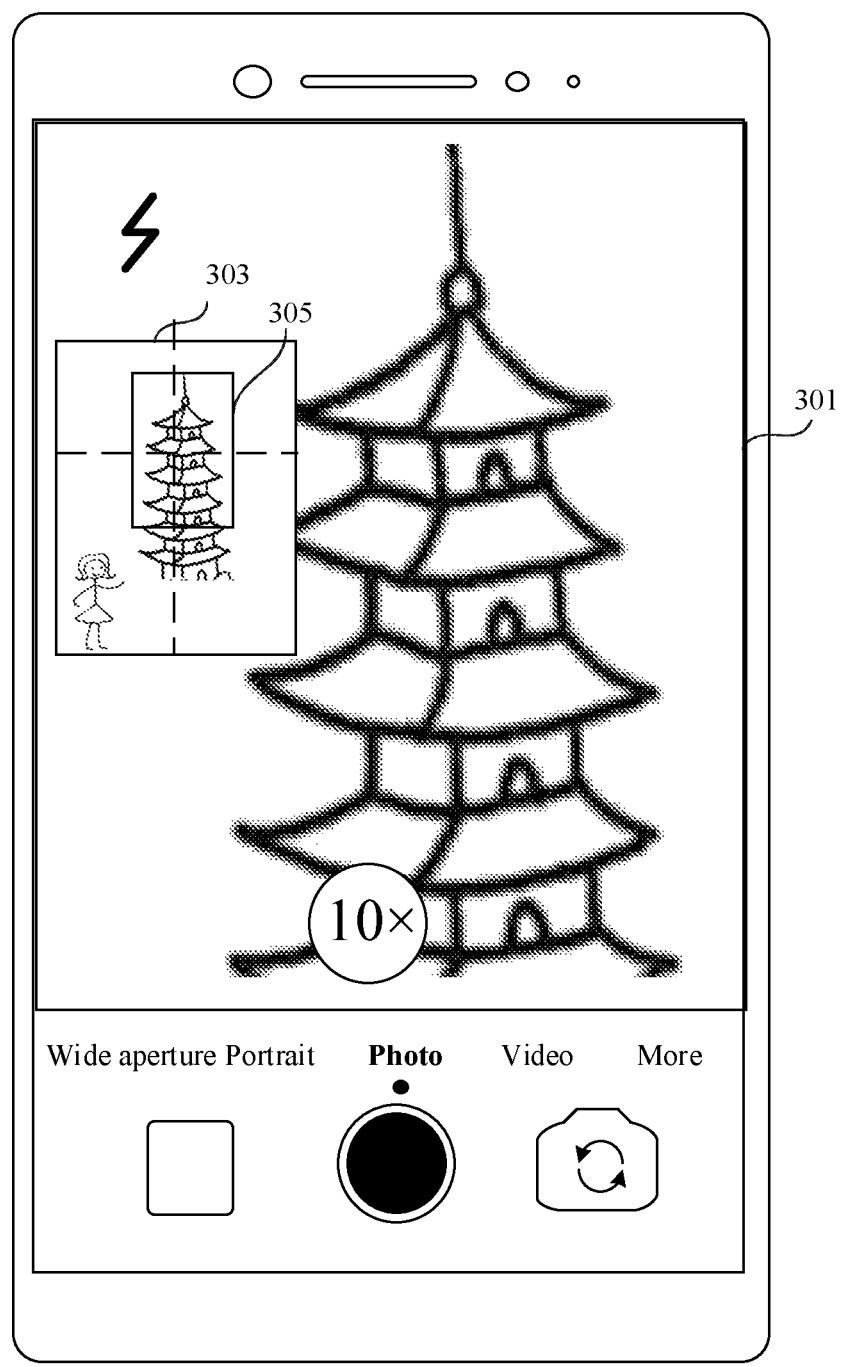

For example, as shown in FIG. 7A and FIG. 7B, if it is detected that the user presses and holds the first mark frame 305 in the auxiliary preview image and slides upward, a mobile phone may move framing ranges corresponding to the primary preview image and the auxiliary preview image upward to a corresponding position, that is, display a photographing interface shown in FIG. 7C or a photographing interface shown in FIG. 7D. Compared with a photographing interface shown in FIG. 7B, the auxiliary preview image on the photographing interface shown in FIG. 7C changes, and the first mark frame 305 returns to the center position of the auxiliary preview image; and the auxiliary preview image on the photographing interface shown in FIG. 7D does not change, and the first mark frame 305 is moved above the center position of the auxiliary preview image.

The mobile phone determines, based on a sliding distance of a finger of the user, a distance (for example, a distance of N pixels) by which the framing range of the auxiliary preview image moves upward; then obtains the auxiliary preview image based on the distance, the raw image captured by the primary camera, and the zoom magnification of the auxiliary preview image; and obtains the primary preview image based on the distance, the raw image captured by the long-focus camera, and the zoom magnification of the primary preview image. For a specific processing method, refer to related descriptions in FIG. 4A to FIG. 4F and FIG. 6A to FIG. 6E In some examples, the sliding distance of the finger is proportional to the moving distance of the framing range of the auxiliary preview image. Alternatively, a distance by which the framing range of the auxiliary preview image moves each time is a fixed value, and one sliding operation of the user on the first mark frame corresponds to one movement of the framing range of the auxiliary preview image. This is not specifically limited in this application.

It can be learned from the foregoing that the user may accurately move the framing range of the primary preview image in a first viewfinder frame by performing a corresponding adjustment operation. This helps quickly move a target photographing object into the primary preview image, and also helps perform more detailed composition on the primary preview image, thereby improving photographing experience of the user.

4. The User Locks the Target Photographing Object, and the Mobile Phone Intelligently Recommends a Zoom Magnification.

In some embodiments of this application, the user may alternatively select to lock one or more target photographing objects, and the mobile phone automatically recommends an appropriate zoom magnification to the user based on the one or more target photographing objects, so that the user quickly switches to the appropriate zoom magnification. This improves framing composition efficiency.

Figure 8A:
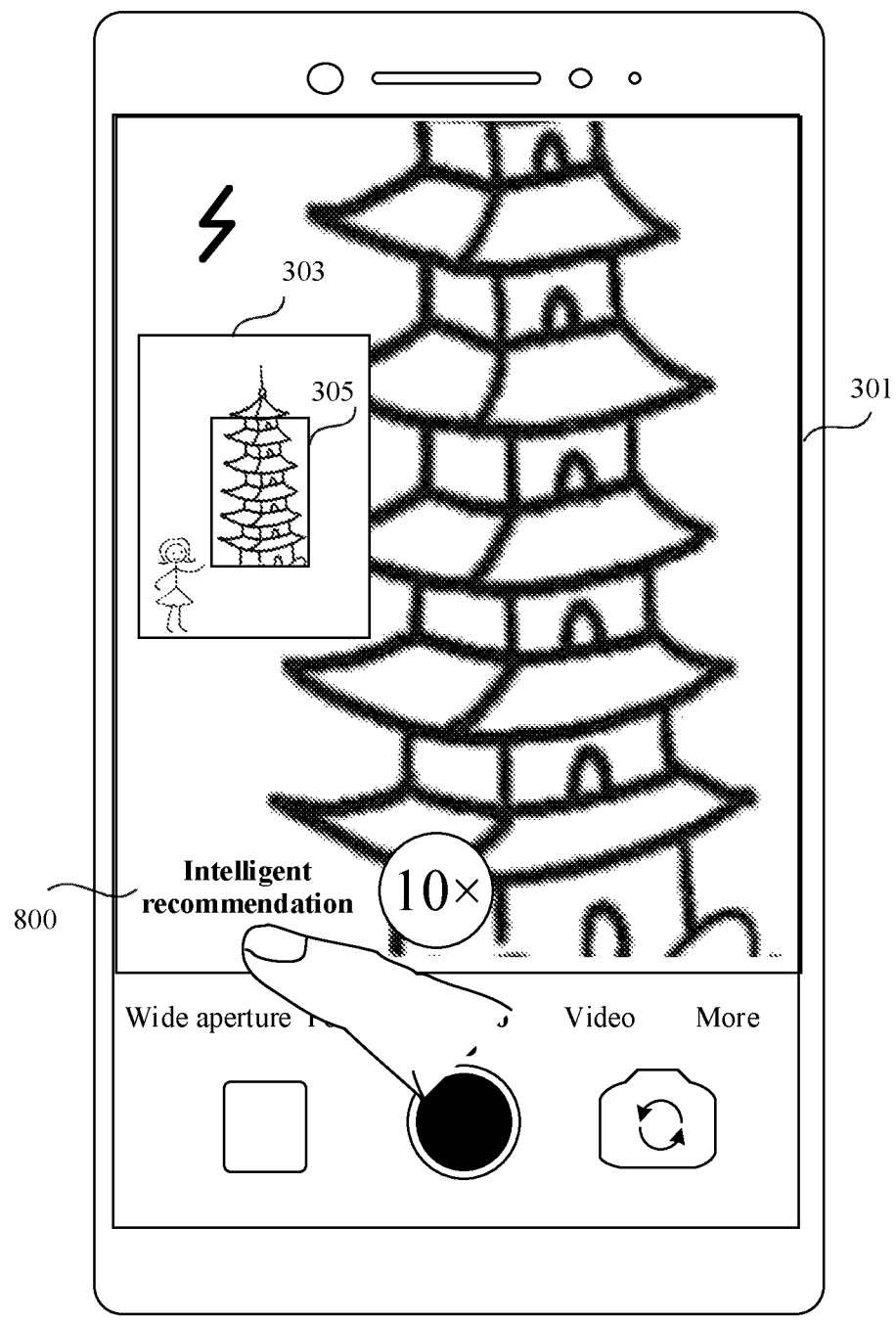
FIG. 8A to FIG. 8F are schematic diagrams of some other user interfaces of a terminal according to an embodiment of this disclosure.
Figure 8B:
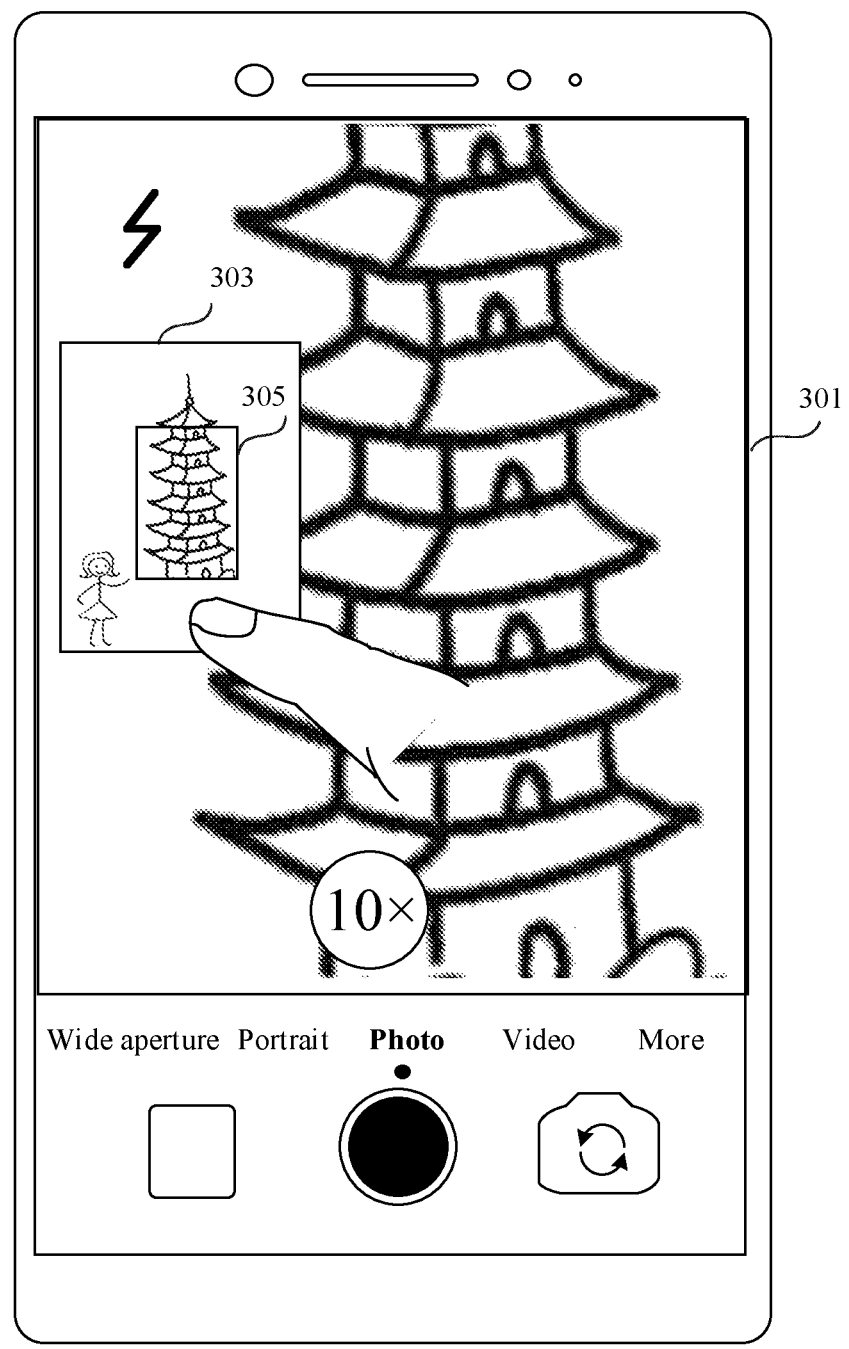

In some examples, as shown in FIG. 8A, in a long-focus photographing mode, a photographing interface may further include an intelligent recommendation control 800. In response to detecting that a user taps the control 800, a mobile phone enters an object locking interface shown in FIG. 8C. Alternatively, as shown in FIG. 8B, the user may perform a specific operation on the second viewfinder frame 303, for example, touching and holding or double-tapping the second viewfinder frame 303. When detecting the specific operation performed by the user, the mobile phone enters the object locking interface shown in FIG. 8C. A specific manner of entering the object locking interface is not limited in this embodiment of this application.

Figure 8C:
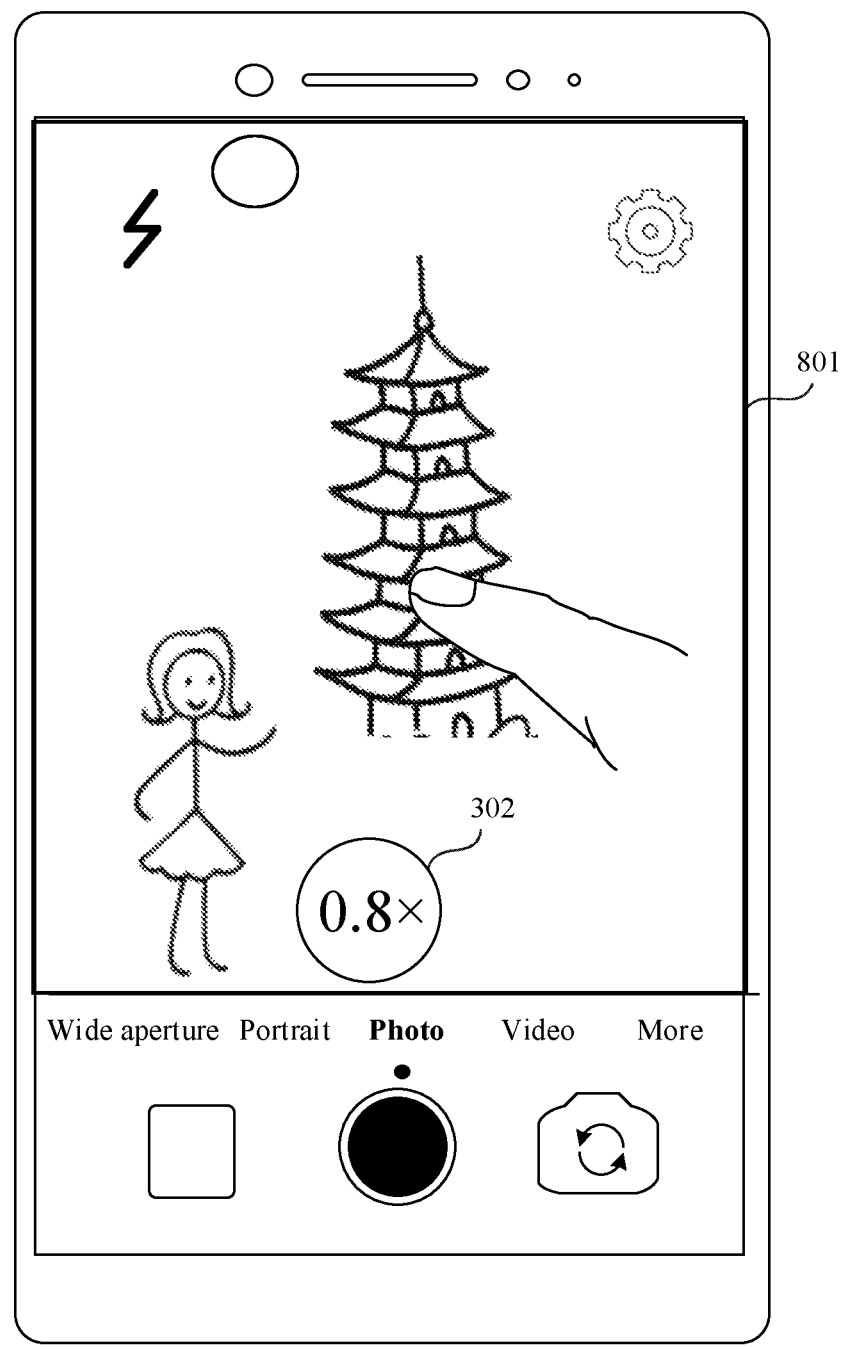

As shown in FIG. 8C, the object locking interface includes a third viewfinder frame 801, and a framing range of the third viewfinder frame 801 is greater than or equal to a framing range corresponding to an auxiliary preview image. In this way, the object locking interface can provide more objects for the user to select. For example, a preview image displayed in the third viewfinder frame 801 may be a raw image captured by a primary camera, that is, may correspond to a zoom magnification K0 (for example, "0.8×"). Certainly, a zoom magnification corresponding to the preview image displayed in the third viewfinder frame 801 may be larger or smaller. When the zoom magnification corresponding to the preview image displayed in the third viewfinder frame 801 is less than the zoom magnification K0, the preview image displayed in the third viewfinder frame 801 may alternatively be obtained by processing a raw image captured by a wide-angle camera. In some examples, the mobile phone may perform image recognition on the preview image in the third viewfinder frame 801, to identify and mark each object, so that the user selects to lock one or more target photographing objects. After selecting to lock one or more target photographing objects, the user marks the selected one or more target photographing objects in another marking manner, to distinguish between recognized objects. In some other examples, the mobile phone may alternatively not first perform image recognition on the preview image in the third viewfinder frame 801, but when detecting a selection operation (for example, a tapping operation) of the user, identify, based on a position at which the selection operation acts, a target photographing object corresponding to the area.

Figure 8D:
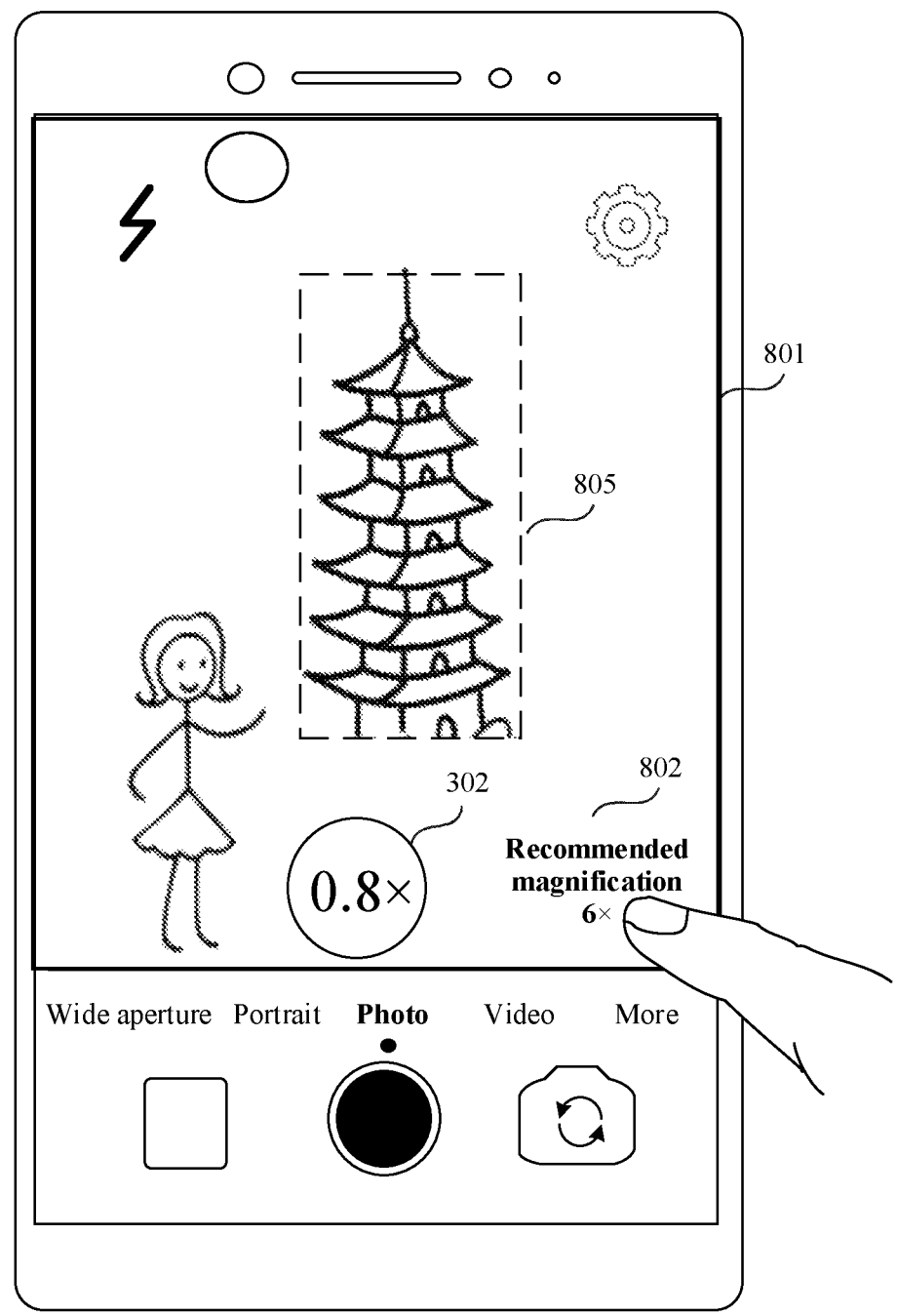

As shown in FIG. 8D, in response to selecting to lock one or more target photographing objects on the object locking interface by the user, the mobile phone may display a second mark frame 805, to mark the selected target photographing object. In addition, the mobile phone may calculate a recommended zoom magnification based on factors such as positions and areas of the one or more selected target photographing objects, a sequence of locking the target object, and a type of the locked target object, and recommend the recommended zoom magnification to the user. In some examples, the mobile phone may display an option 802 of a recommended magnification. In response to detecting that the user selects the option 802 of a recommended magnification, the mobile phone may first display a preview image 804 corresponding to the recommended magnification (for example, "6×"). The user may determine, by tapping an OK control 803, to use the recommended zoom magnification, or the mobile phone automatically changes, after a period of time, a zoom magnification used by the mobile phone. Then, the mobile phone displays a photographing interface shown in FIG. 8F. The interface includes the first viewfinder frame 301, the second viewfinder frame 303, the adjustment controls 304, and the like. The first viewfinder frame 301 corresponds to the recommended zoom magnification. In other words, the user may directly perform a photographing operation, or may further adjust a primary preview image at the recommended zoom magnification by using the adjustment controls 304. In some other examples, an auxiliary preview image on the photographing interface shown in FIG. 8F may further continue to display the second mark frame 805, that is, mark the locked target photographing object. In this way, the user may further adjust a framing range of the primary preview image by using relative positions of the second mark frame 805 and the first mark frame 305 in the auxiliary preview image.

Figure 8E:
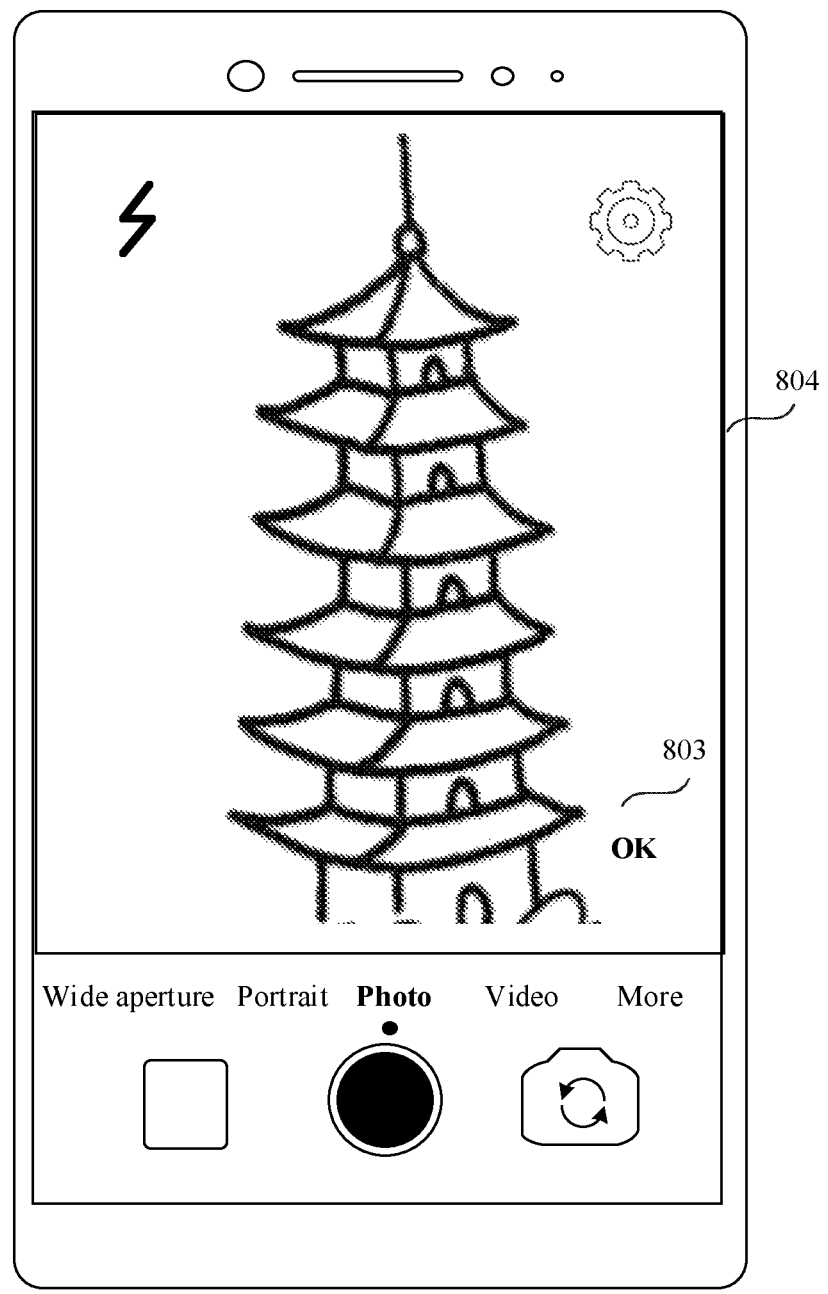
Figure 8F:
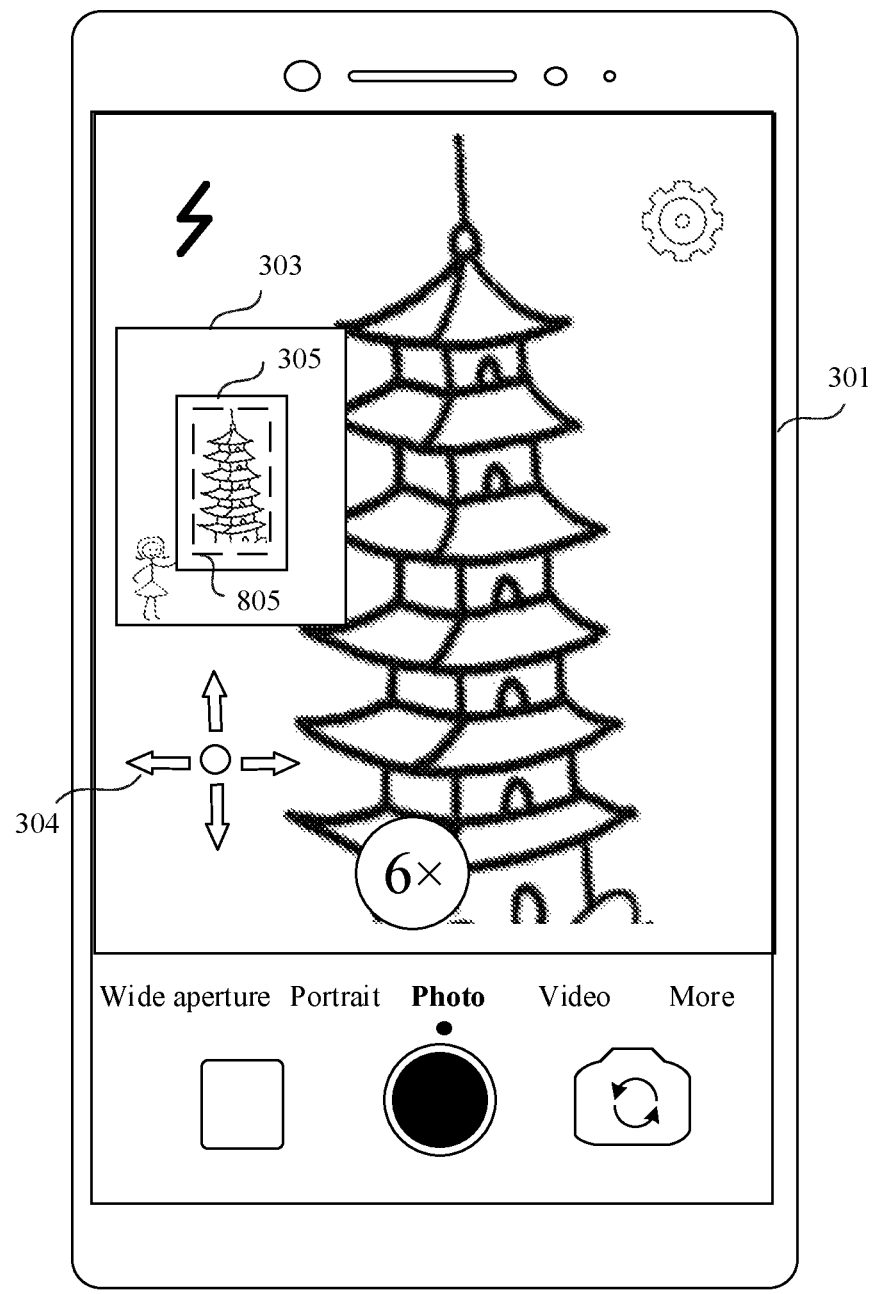

In some other examples, when the mobile phone displays the preview image 804 corresponding to the recommended zoom magnification shown in FIG. 8E, the user may directly perform a photographing operation to photograph a photo or a video.

With reference to the accompanying drawings, the following specifically describes a method for calculating a recommended zoom magnification by the mobile phone based on the locked target photographing object.

Specifically, a center position of the object locking interface is used as a center, and an area for selecting locked target photographing object is used as a target area, to calculate a proportion of the target area in a total area of the object locking interface, and calculate the recommended zoom magnification based on the proportion with reference to a length-width ratio of the primary preview image.

Figure 9A:
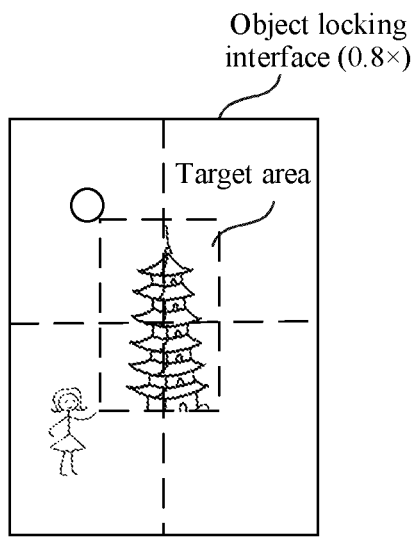
FIG. 9A to FIG. 9D are schematic diagrams of an image processing method in still another photographing method according to an embodiment of this disclosure.
Figure 9B:
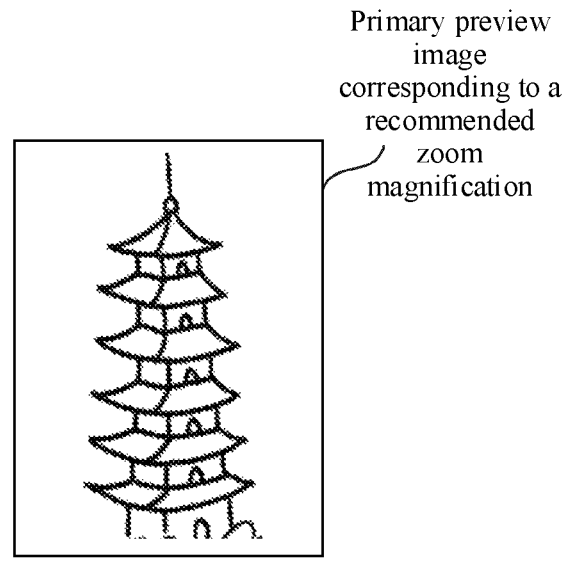
Figure 9C:
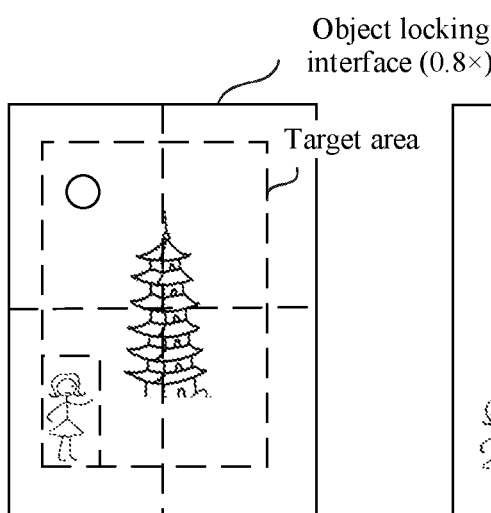
Figure 9D:
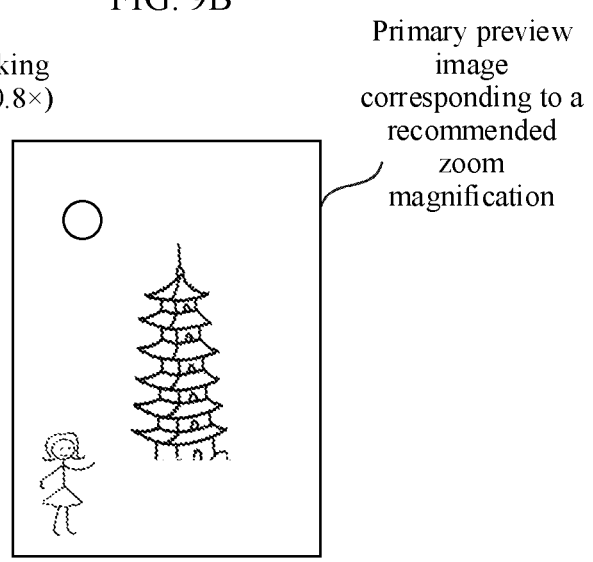

For example, as shown in FIG. 9A, if a target photographing object (for example, a "tower") is locked, and the target photographing object is located at a center position of an object locking interface, an area of the target photographing object is a target area. FIG. 9B is a primary preview image displayed at a recommended zoom magnification. As shown in FIG. 9C, if a target photographing object (for example, a "person") is locked, and the target photographing object is not located at the center position of the object locking interface, the center position of the object locking interface is used as a center position of the target area, and an area including an outer edge of the target photographing object is used as the target area. FIG. 9D is a primary preview image displayed at a recommended zoom magnification.

For another example, as shown in FIG. 10A, if a plurality of target photographing objects (for example, a "man" and a "woman") are locked, a center position of an object locking interface is used as a center position of a target area, and an area including outer edges of the plurality of target photographing objects is used as the target area. FIG. 10B is a primary preview image displayed at a recommended zoom magnification.

In some examples, if it is determined that a proportion that the target area occupies a total area of the object locking interface is less than a threshold, it is considered that the target area is zoomed in at a relatively small magnification, and this is meaningless. Alternatively, a mobile phone may determine, based on priorities of the plurality of locked target photographing objects, that a target photographing object with a high priority is an object displayed in a primary preview image. For example, as shown in FIG. 10C, if a plurality of target photographing objects (for example, the "man", the "woman", and a "moon") are locked, a center position of an object locking interface is used as a center position of a target area, and an area including outer edges of the plurality of target photographing objects is used as the target area. If a proportion that the target area occupies a total area of the object locking interface is less than a threshold, a new target area is re-determined based on target photographing objects (for example, the "woman" and the "man") with high priorities. FIG. 10D is a primary preview image displayed at a recommended zoom magnification.

The mobile phone may determine a priority based on a sequence of locking the target object, a position of the target object on the locking interface, an area of the target object, a type of the target object, and the like. For example, it may be considered that a priority of a target object first locked by a user is higher than a priority of a target object locked later. For another example, it may be considered that a priority of a target object in a central area of the object locking interface is higher than a priority of a target object at an edge position. For another example, it may be considered that a priority of a target object with a large area is higher than a priority of a target object with a small area. For another example, priorities of types of the target objects may be arranged as follows: people>animals>buildings>plants> . . . . Setting of the priorities of the target photographing objects is not specifically limited in this embodiment of this application.

A case in which the user locks three target photographing objects shown in FIG. 10C is used as an example below to describe in detail that the mobile phone further adjusts a framing range of the primary preview image after entering the recommended zoom magnification.

Figure 10E:
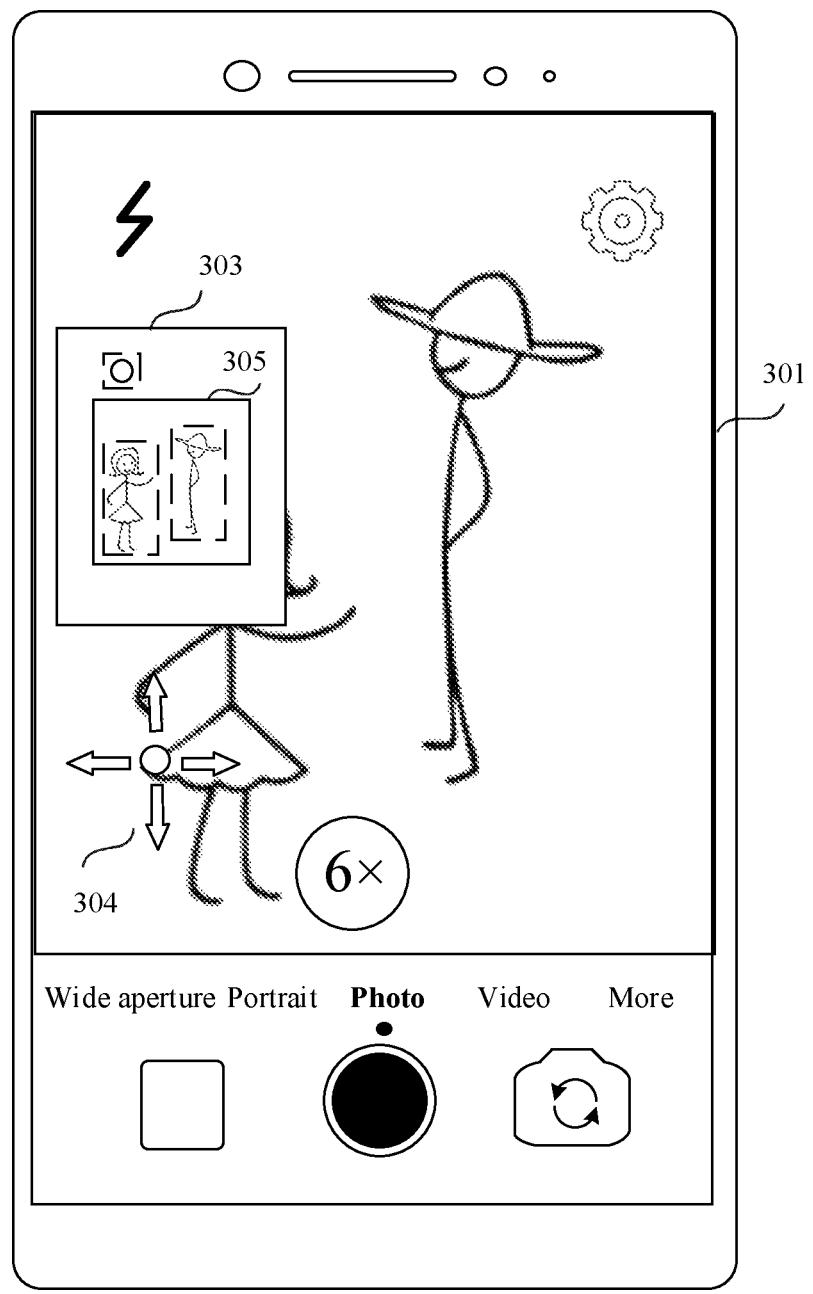

For example, as shown in FIG. 10C, after the user locks three target photographing objects (the "man", "woman", and the "moon"), the mobile phone determines two objects (the "man" and the "woman") with high priorities in the three target photographing objects, and calculates the recommended zoom magnification (for example, "6×") based on the two objects. After the user selects to use the recommended zoom magnification, the mobile phone displays an interface shown in FIG. 10E. The interface includes the first viewfinder frame 301, the second viewfinder frame 303, and the adjustment controls 304. The second viewfinder frame 303 includes the first mark frame 305 and a plurality of second mark frames (shown in dashed lines in the figure). It can be learned that at the recommended zoom magnification, the first mark frame 305 includes target photographing objects (the "man" and the "woman") with higher priorities. The target photographing object (the "moon") with a lower priority is located outside the first mark frame 305. Further, the user may adjust a framing range of the first viewfinder frame 301 with reference to relative positions of the second mark frame and the first mark frame 305.

Figure 10F:
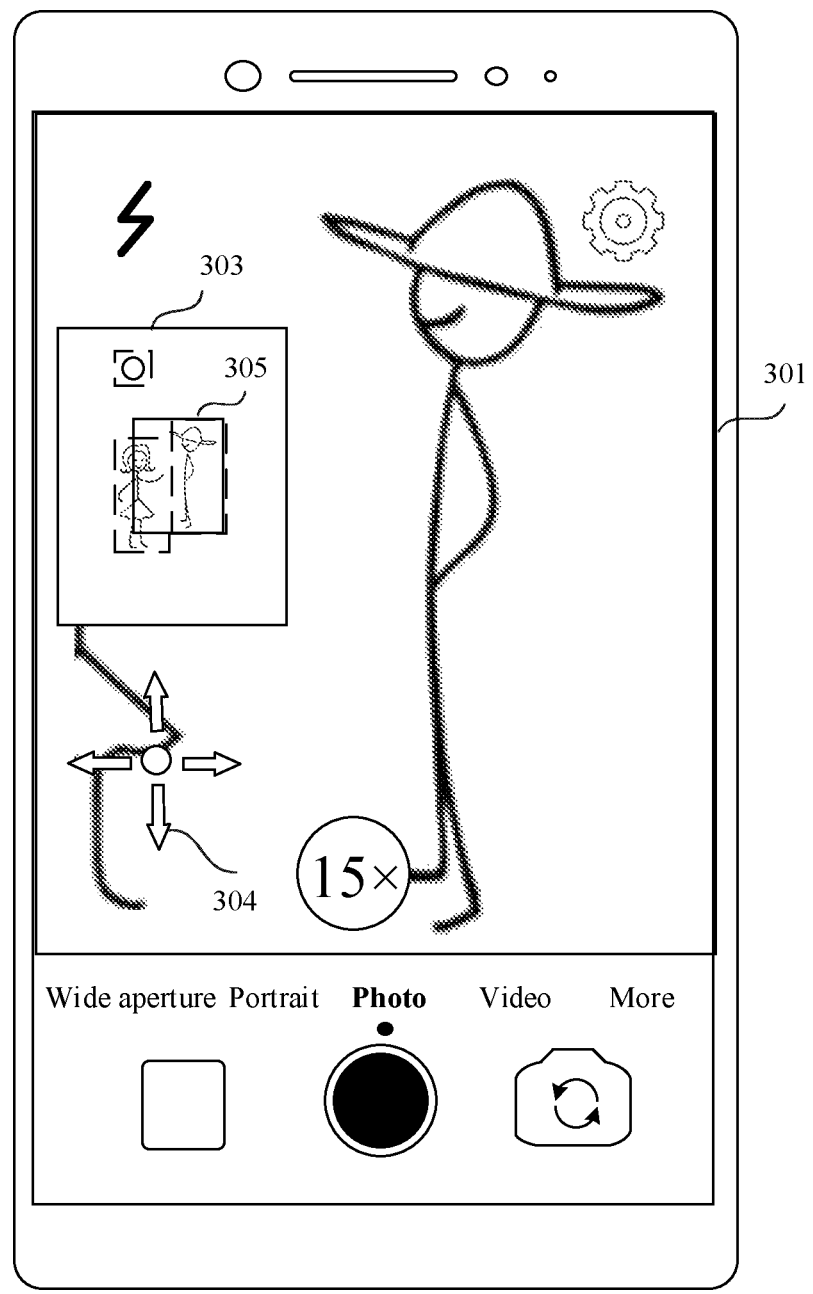

For example, if the user wants to photograph the "man" alone, the user may increase a current zoom magnification of the mobile phone, for example, increase the zoom magnification to "15×". On an interface shown in FIG. 10F, an image in the second viewfinder frame 303 remains unchanged, a center of the first mark frame 305 is still located in a center of the second viewfinder frame 303, but an area of the first mark frame 305 decreases as the zoom magnification increases. In other words, selected content in the first mark frame 305 becomes smaller. In this case, the user may operate the adjustment controls 304 to adjust the second mark frame marking the "man" into the first mark frame 305, to achieve an effect of adjusting a framing range of the first viewfinder frame, and achieve an objective of photographing the "man". It can be learned from the foregoing description of adjustment implementation that, in an example, when the user operates the adjustment controls 304, a position of the first mark frame 305 remains unchanged, and an auxiliary preview image in the second viewfinder frame 303 correspondingly changes. In this case, the second mark frame changes with a position of a locked target photographing object. In another example, when the user operates the adjustment controls 304, if the auxiliary preview image in the second viewfinder frame 303 remains unchanged, a position of the second mark frame also remains unchanged. The position of the first mark frame 305 correspondingly changes. For a specific adjustment process, refer to the foregoing descriptions. Details are not described herein again.

For another example, if the user wants to photograph the "moon" in the primary preview image that does not enter the recommended zoom magnification, the user may operate the adjustment controls 304 and change the zoom magnification in the second viewfinder frame 303, to adjust the second mark frame marking the "moon" into the first mark frame 305, so as to achieve the effect of adjusting the framing range of the first viewfinder frame, and achieve an objective of photographing the "moon".

It should be noted that the foregoing method for locking the target photographing object on the object locking interface and calculating the recommended zoom magnification based on a position of the target photographing object may also be used in a non-long-focus photographing mode. This is not limited in this embodiment of this application.

The foregoing embodiment is described by using photographing in the camera application as an example. The method in this application may also be used for video recording in the camera application. The method is similar, and is briefly described herein.

When a mobile phone enables a video recording function and does not start recording, the method provided in this application may be used to display a primary preview image and an auxiliary preview image in a case of a high zoom magnification (the zoom magnification is greater than or equal to a preset magnification). This helps a user perform composition design on the primary preview image based on the auxiliary preview image with a larger framing range. Alternatively, a framing range corresponding to the primary preview image may be adjusted without moving the mobile phone.

In a video recording process of the mobile phone, in a high zoom magnification scenario, the primary preview image and the auxiliary preview image are displayed, so that the user can perform framing based on the auxiliary preview image and track and photograph a moving object in the video recording process.

For example, in the video recording process, if the user wants to change a target photographing object, the user may determine a new photographing object by using the auxiliary preview image with a larger framing range in the second viewfinder frame, and move the mobile phone to continue recording. Alternatively, when selecting the new target photographing object in the second viewfinder frame, the user may manually move the mobile phone to change the framing range of the primary preview image, or may change the framing range of the primary preview image based on an adjustment operation of the user without moving a position of the mobile phone, so that the new target photographing object appears in the first viewfinder frame (that is, a recording range).

For other content, refer to descriptions of the foregoing related content. Details are not described herein again.

Figure 11:
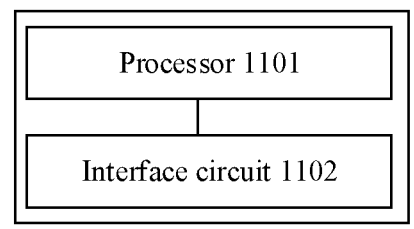
FIG. 11 is a schematic diagram of a structure of a chip system according to an embodiment of this disclosure.

An embodiment of this application further provides a chip system. As shown in FIG. 11, the chip system includes at least one processor 1101 and at least one interface circuit 1102. The processor 1101 and the interface circuit 1102 may be interconnected through a line. For example, the interface circuit 1102 may be configured to receive a signal from another apparatus (for example, a memory in the terminal 100). For another example, the interface circuit 1102 may be configured to send a signal to another apparatus (for example, the processor 1101). For example, the interface circuit 1102 may read instructions stored in the memory, and send the instructions to the processor 1101. When the instructions are executed by the processor 1101, a terminal may be enabled to perform steps performed by the terminal 100 (for example, a mobile phone) in the foregoing embodiments. Certainly, the chip system may further include another discrete component. This is not specifically limited in this embodiment of this application.

An embodiment of this application further provides an apparatus. The apparatus is included in a terminal, and the apparatus has a function of implementing behavior of the terminal in any method in the foregoing embodiments. The function may be implemented by hardware, or may be implemented by hardware executing corresponding software. The hardware or the software includes at least one module or unit corresponding to the function, for example, a detection module or unit, a display module or unit, and a determining module or unit.

An embodiment of this application further provides a computer-readable storage medium, including computer instructions. When the computer instructions are run on a terminal, the terminal is enabled to perform any method in the foregoing embodiments.

An embodiment of this application further provides a computer program product. When the computer program product runs on a computer, the computer is enabled to perform any method in the foregoing embodiments.

It may be understood that, to implement the foregoing functions, the terminal includes a corresponding hardware structure and/or software module for executing the functions. A person skilled in the art should be easily aware that, in combination with the examples described in embodiments disclosed in this specification, units, algorithms, and steps may be implemented by hardware or a combination of hardware and computer software in embodiments of this application. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of embodiments of the present invention.

In embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in embodiments of the present invention, module division is an example, and is merely a logical function division. During actual implementation, another division manner may be used.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented based on a requirement. In other words, an inner structure of an apparatus is divided into different function modules to implement all or some of the functions described above. For a detailed working process of the foregoing system, apparatus, and units, refer to a corresponding process in the foregoing method embodiments. Details are not described herein again.

Function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A photographing method performed with a camera, the method comprising:

displaying, in a first viewfinder frame of the camera, a first preview image, the first preview image being associated with a first zoom magnification;

displaying, in the first viewfinder frame, a second preview image following detection of an increase in zoom magnification from the first zoom magnification to a second zoom magnification, the second preview image being associated with the second zoom magnification, the second zoom magnification being greater than the first zoom magnification;

displaying a second viewfinder frame and a first mark frame when the second zoom magnification is greater than a preset magnification, wherein the second viewfinder frame displays a third preview image, a framing range of the third preview image is greater than a framing range of the second preview image, the first mark frame identifies a position in the third preview image of an image having substantially the same framing range as the second preview image, and the framing range of the second preview image is adjustable using at least one adjustment control;

displaying a fourth preview image when detecting an operation enabling a first mode, a framing range of the fourth preview image being greater than or equal to the framing range of the third preview image;

receiving operation input for selecting one or more target photographing objects in the fourth preview image; and displaying one or more second mark frames in the fourth preview image in response to the operation input and displaying a recommended third zoom magnification, wherein the one or more second mark frames represent the one or more selected target photographing objects.

2. The method according to claim 1, the at least one adjustment control comprising a first control adjustable in a first adjustment direction, the method comprising:

adjusting the framing range of the second preview image toward the first direction by a first distance that is less than a preset threshold, when detecting an operation on the first control corresponding to the first adjustment direction.

3. The method according to claim 2, comprising:

adjusting the framing range of the third preview image toward the first direction by a second distance and maintaining substantially constant a position of the first mark frame in the third preview image when detecting operation on the first control corresponding to the first direction, the second distance being related to a zoom magnification corresponding to the third preview image, the second zoom magnification, and the first distance.

4. The method according to claim 2, comprising:

adjusting a position of the first mark frame in the third preview image in the first direction by a second distance and maintaining substantially constant the framing range of the third preview image, the second distance being related to a zoom magnification corresponding to the third preview image, the second zoom magnification, and the first distance.

5. The method according to claim 2, wherein the second preview image is obtained based on an image captured by a long-focus camera lens and the third preview image is obtained based on an image captured by a medium-focus camera lens or a wide-angle camera lens.

6. The method according to claim 5, wherein the preset threshold is related to a size of the image captured by the long-focus camera lens and the second zoom magnification associated with the second preview image.

7. The method according to claim 1, comprising:

adjusting the framing range of the second preview image towards the first direction by a first distance that is less than a preset threshold when detecting a drag operation on the first mark frame in the first direction.

8. The method according to claim 7, comprising:

adjusting the framing range of the third preview image toward the first direction by a second distance when detecting the drag operation on the first mark frame towards the first direction and maintaining substantially constant a position of the first mark frame in the third preview image, the second distance being related to a zoom magnification corresponding to the third preview image, the second zoom magnification, and the first distance.

9. The method according to claim 7, comprising:

adjusting the position of the first mark frame in the third preview image toward the first direction by a second distance when detecting the drag operation on the first mark frame in the first direction and maintaining substantially constant the framing range of the third preview image, the second distance being related to a zoom magnification corresponding to the third preview image, the second zoom magnification, and the first distance.

10. The method according to claim 1, wherein the recommended third zoom magnification is generated by processing in a processor image data associated with positions and areas of the one or more target photographing objects in the fourth preview image and one or more priorities accessed from memory coupled to the processor, the priorities establishing a hierarchical order of image content for capture from the one or more selected target photographing objects.

11. The method according to claim 1, comprising:

displaying a fifth preview image on the first viewfinder frame responsive to detecting an operation of selecting the third zoom magnification, the fifth preview image being associated with the third zoom magnification, the second viewfinder frame of the terminal displaying a sixth preview image, the sixth preview image comprising the first mark frame and the one or more second mark frames.

12. A camera, comprising a processor, a memory, and a touchscreen, the memory and the touchscreen being coupled to the processor, the memory being configured to store instructions that, when executed by the processor, cause the camera to perform the following operations:

displaying on the touchscreen a first viewfinder frame, the first viewfinder frame displaying a first preview image associated with a first zoom magnification;

displaying in the first viewfinder frame a second preview image following detection of an operation to increase zoom magnification of the camera from the first zoom magnification to a second zoom magnification, the second preview image being associated with the second zoom magnification, the second zoom magnification being greater than the first zoom magnification;

displaying a second viewfinder frame and a first mark frame when the second zoom magnification is greater than or equal to a preset magnification, wherein the second viewfinder frame displays a third preview image, a framing range of the third preview image is greater than a framing range of the second preview image, the first mark frame identifies a position in the third preview image of an image having substantially the same framing range as the second preview image, and the framing range of the second preview image is adjustable by using at least one adjustment control; and displaying a fourth preview image when detecting an operation enabling a first mode, a framing range of the fourth preview image being greater than or equal to the framing range of the third preview image;

receiving operation input for selecting one or more target photographing objects in the fourth preview image; and displaying, one or more second mark frames in the fourth preview image in response to the operation input and displaying a recommended third zoom magnification, wherein the one or more second mark frames represent the one or more selected target photographing objects.

13. The camera according to claim 12, the at least one adjustment control comprising a first control adjustable in a first direction, the instructions when executed by the processor causing the camera to perform the following operation:

adjust the framing range of the second preview image toward the first direction by a first distance when detecting an operation on the first control corresponding to the first direction, moving, wherein the first distance is less than a preset threshold.

14. The camera according to claim 13, the instructions, when executed by the processor, causing the camera to perform the following operation:

adjusting the framing range of the third preview image toward the first direction by a second distance and maintaining substantially constant a position of the first mark frame in the third preview image when detecting the operation of the user on the first control corresponding to the first direction, the second distance being related to a zoom magnification corresponding to the third preview image, the second zoom magnification, and the first distance.

15. The camera according to claim 13, the instructions, when executed by the processor, causing the camera to perform the following operation:

adjusting a position of the first mark frame in the third preview image toward the first direction by a second distance and maintaining substantially constant the framing range of the third preview image when detecting the operation of the user on the first control corresponding to the first direction, the second distance being related to a zoom magnification corresponding to the third preview image, the second zoom magnification, and the first distance.

16. The camera according to claim 12, the instructions, when executed by the processor, causing the camera to perform the following operation:

adjusting the framing range of the second preview image toward the first direction by a first distance, wherein the first distance is less than a preset threshold when detecting a drag operation of the first mark frame in a first direction.

17. The camera according to claim 16, the instructions, when executed by the processor, causing the camera to perform the following operation:

adjusting the framing range of the third preview image in the first direction by a second distance when detecting the drag operation of the first mark frame toward the first direction, moving, the second distance being related to a zoom magnification corresponding to the third preview image, the second zoom magnification, and the first distance.

18. The camera according to claim 16, the instructions, when executed by the processor, causing the camera to perform the following operation:

adjusting a position of the first mark frame in the third preview image towards the first direction by a second distance and maintaining substantially constant the framing range of the third preview image when detecting the drag operation of the first mark frame towards the first direction, moving, wherein the framing range of the third preview image does not change, the second distance being related to a zoom magnification corresponding to the third preview image, the second zoom magnification, and the first distance.

19. The camera according to claim 13, the second preview image being obtained based on an image captured by a long-focus camera lens, the third preview image being obtained based on an image captured by a medium-focus camera lens or a wide-angle camera lens.

* * * * *